United States Patent
Fowe et al.

(10) Patent No.: US 10,502,579 B2
(45) Date of Patent: Dec. 10, 2019

(54) METHOD AND APPARATUS FOR DETERMINING MODAL ROUTES BETWEEN AN ORIGIN AREA AND A DESTINATION AREA

(71) Applicant: HERE Global B.V., Eindhoven (NL)

(72) Inventors: James Fowe, Chicago, IL (US); Filippo Pellolio, Chicago, IL (US)

(73) Assignee: HERE Global B.V., Eindhoven (NL)

(*) Notice: Subject to any disclaimer, the term of this patent is extended or adjusted under 35 U.S.C. 154(b) by 5 days.

(21) Appl. No.: 15/334,003

(22) Filed: Oct. 25, 2016

(65) Prior Publication Data

US 2018/0112990 A1    Apr. 26, 2018

(51) Int. Cl.
*G01C 21/34* (2006.01)
*G01C 21/36* (2006.01)

(52) U.S. Cl.
CPC ..... *G01C 21/3484* (2013.01); *G01C 21/3676* (2013.01)

(58) Field of Classification Search
USPC ........................................................ 701/410
See application file for complete search history.

(56) References Cited

U.S. PATENT DOCUMENTS

| | | | |
|---|---|---|---|
| 7,197,394 B2 | 3/2007 | Ohler | |
| 8,595,159 B2 * | 11/2013 | McNair | A61B 5/021 706/12 |
| 8,649,970 B2 | 2/2014 | Bhogal et al. | |
| 9,196,087 B2 | 11/2015 | Kaatz et al. | |
| 9,510,154 B2 * | 11/2016 | Mori | H04W 4/029 |
| 2001/0043721 A1 * | 11/2001 | Kravets | G06T 7/20 382/107 |
| 2002/0069015 A1 * | 6/2002 | Fox | G01C 21/3461 701/400 |

(Continued)

OTHER PUBLICATIONS

Denman, Steve et al., Estimating Traffic Delays and Network Speeds from Low-Frequency GPS Taxis Traces for Urban Transport Modelling, Article in European Journal of Transport and Infrastructure Research • Sep. 2015, Issue 15(4), 2015 pp. 639-661, ISSN: 1567-7141 (tlo.tbm.tudelft.nl/ejtir) (https://www.researchgate.net/profile/Vassilis_Zacharia.*

(Continued)

*Primary Examiner* — Jean Paul Cass
(74) *Attorney, Agent, or Firm* — Ditthavong & Steiner, P.C.

(57) ABSTRACT

An approach is provided for determining one or more modal routes between one or more origin areas and one or more destination areas based on trajectory data. The approach involves querying, by a processor, a trajectory database to retrieve one or more trajectories that contain one or more probe points located within the one or more origin areas and the one or more destination areas. The approach also involves clustering, by the processor, the one or more trajectories into one or more trajectory clusters based on a distance. The approach further involves determining, by the processor, respective counts of the one or more trajectories within each of the one or more trajectory clusters. The approach further involves presenting, by the processor, at least one of the one or more trajectory clusters as the one or more modal routes based on the respective counts.

16 Claims, 16 Drawing Sheets

(56) References Cited

U.S. PATENT DOCUMENTS

| | | | | |
|---|---|---|---|---|
| 2006/0151214 | A1* | 7/2006 | Prange | E21B 7/04 175/45 |
| 2006/0206261 | A1* | 9/2006 | Altaf | B60R 25/04 701/533 |
| 2015/0134850 | A1 | 5/2015 | Rolf et al. | |
| 2015/0300835 | A1 | 10/2015 | Fowe et al. | |
| 2017/0286781 | A1* | 10/2017 | Xu | G06K 9/6212 |
| 2018/0023960 | A1* | 1/2018 | Fridman | G06K 9/00791 382/104 |
| 2018/0023961 | A1* | 1/2018 | Fridman | G06K 9/00791 382/104 |
| 2018/0024562 | A1* | 1/2018 | Bellaiche | G01S 19/48 701/26 |
| 2018/0024565 | A1* | 1/2018 | Fridman | G06K 9/00791 701/26 |
| 2018/0024568 | A1* | 1/2018 | Fridman | G06K 9/00791 701/28 |
| 2018/0025235 | A1* | 1/2018 | Fridman | G06K 9/00791 382/103 |
| 2018/0198716 | A1* | 7/2018 | Karthikeyan | H04L 41/5022 |

OTHER PUBLICATIONS

Hunter, Timothy et al. The Path Interference Filter: Model Based Low Latency Map Matching of Probe Vehicle Data, University of California at Berkeley, Algorithmic Foundations of Robotics X, pp. 591-607, Springer Berlin Heidelberg (2013) (https://arxiv.org/pdf/11Q9.1966.pdf).*

Li Q., Watanabe C. (eds) Database Systems for Advanced Applications. DASFAA 2010. Lecture Notes in Computer Science, vol. 5982. Springer, Berlin, Heidelberg (https://link.springer.com/chapter/10.1007/978-3-642-12098-5_3#citeas) (2010)(hereinafter "Li").*

H. T. Shen, Z. Chen and X. Zhou, "Discovering popular routes from trajectories," 2011 IEEE 27th International Conference on Data Engineering(ICDE), Hannover, Germany, 2011, pp. 900-911.doi:10.1109/ICDE.2011.5767890.*

BBC, "Boris Johnson pushes on with Embankment cycle super-highway", Jan. 27, 2015, web page, retrieved from http://www.bbc.com/news/uk-england-london-30993893, pp. 1-10.

Giannotti et al., "Unveiling the complexity of human mobility by querying and mining massive trajectory data", The VLDB Journal, published online Jul. 30, 2011, 25 pages.

Koroliuk et al., "Analysis of big data set of urban traffic data", project report, M2 Project, 2015, pp. 1-12.

Wei et al., "Constructing Popular Routes from Uncertain Trajectories", Aug. 12-16, 2012, 9 pages.

Wikipedia, "Ramer-Douglas-Peucker algorithm", web page, last modified Oct. 13, 2016, retrieved from https://en.wikipedia.org/wiki/Ramer%E2%80%93Douglas%E2%80%93Peucker_algorithm, pp. 1-4.

Wikipedia, "Hausdorff distance", web page, last modified Jul. 28, 2016, retrieved from https://en.wikipedia.org/wiki/Hausdorff_distance, pp. 1-4.

Wikipedia, "k-medoids", web page, last modified Oct. 21, 2016, retrieved from https://en.wikipedia.org/wiki/K-medoids, pp. 1-6.

Zheng, "Trajectory Data Mining: An Overview", AM Transactions on Intelligent Systems and Technology, vol. 6, No. 3, Article 29, published May 2015, 41 pages.

Chen et al., "Discovering Popular Routes from Trajectories", Proceedings of the 2011 IEEE 27th International Conference on Data Engineering, published Apr. 11, 2011, 12 pages.

* cited by examiner

METHOD AND APPARATUS FOR DETERMINING MODAL ROUTES BETWEEN AN ORIGIN AREA AND A DESTINATION AREA

BACKGROUND

Routing between origins and destinations remains an ongoing technical challenge for mapping-related service providers (e.g., map data providers, navigation service providers, etc.). For example, providers are generally able to calculate and inform end users as to which is the fastest route from an origin point to a destination as well as the "best" route in terms of other parameters such as traffic, toll fares, topography, and the like. However, this calculated route often may not match the route that most people actually take from the origin point to the destination. For example, the number of travelers that actually take a calculated route may dramatically decrease during periods of road repair or construction on the calculated route. Even in the absence of an unexpected event on the calculated route, other hidden or unaccounted for factors may cause travelers to not take a route calculated or expected by a service provider. Accordingly, service providers face significant technical challenges to determine the modal (i.e., most popular) routes actually taken by users between an origin and a destination.

SOME EXAMPLE EMBODIMENTS

Therefore, there is a need for an approach for determining one or more modal routes between one or more origin areas and one or more destination areas based on trajectory data (e.g., probe data indicating actual journeys taken by a group of observed probe points).

According to one embodiment, a method comprises querying, by a processor, a trajectory database to retrieve one or more trajectories that contain one or more probe points located within the one or more origin areas and the one or more destination areas. The one or more probe points are collected from one or more sensors of a plurality of devices traveling through the origin area and the destination area, and indicate a position, a heading, a speed, a time, or a combination thereof of each of the plurality of devices. The method also comprises clustering, by the processor, the one or more trajectories into one or more trajectory clusters based on a distance. The method further comprises determining, by the processor, respective counts of the one or more trajectories within each of the one or more trajectory clusters. The method further comprises presenting, by the processor, at least one of the one or more trajectory clusters as the one or more modal routes based on the respective counts.

According to another embodiment, an apparatus comprises at least one processor, and at least one memory including computer program code for one or more computer programs, the at least one memory and the computer program code configured to, with the at least one processor, cause, at least in part, the apparatus to query, by a processor, a trajectory database to retrieve one or more trajectories that contain one or more probe points located within the origin area and the destination area. The one or more probe points are collected from one or more sensors of a plurality of devices traveling through the origin area and the destination area, and indicate a position, a heading, a speed, a time, or a combination thereof of each of the plurality of devices. The apparatus is also caused to cluster, by the processor, the one or more trajectories into one or more trajectory clusters based on a distance. The apparatus is further caused to determine respective counts of the one or more trajectories within each of the one or more trajectory clusters. The apparatus is also caused to present, by the processor, at least one of the one or more trajectory clusters as the one or more modal routes based on the respective counts.

According to another embodiment, a computer-readable storage medium carries one or more sequences of one or more instructions which, when executed by one or more processors, cause, at least in part, an apparatus to query, by a processor, a trajectory database to retrieve one or more trajectories that contain one or more probe points located within the origin area and the destination area. The one or more probe points are collected from one or more sensors of a plurality of devices traveling through the origin area and the destination area, and indicate a position, a heading, a speed, a time, or a combination thereof of each of the plurality of devices. The apparatus is also caused to cluster, by the processor, the one or more trajectories into one or more trajectory clusters based on a distance. The apparatus is further caused to determine, by the processor, respective counts of the one or more trajectories within each of the one or more trajectory clusters. The apparatus is also caused to present, by the processor, at least one of the one or more trajectory clusters as the one or more modal routes based on the respective counts.

According to another embodiment, an apparatus comprises means for querying, by a processor, a trajectory database to retrieve one or more trajectories that contain one or more probe points located within the origin area and the destination area. The one or more probe points are collected from one or more sensors of a plurality of devices traveling through the origin area and the destination area, and indicate a position, a heading, a speed, a time, or a combination thereof of each of the plurality of devices. The apparatus also comprises means for clustering, by the processor, the one or more trajectories into one or more trajectory clusters based on a distance. The apparatus further comprises means for determining, by the processor, respective counts of the one or more trajectories within each of the one or more trajectory clusters. The apparatus further comprises means for presenting, by the processor, at least one of the one or more trajectory clusters as the one or more modal routes based on the respective counts.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining one or more modal routes between one or more origin areas and one or more destination areas based on trajectory data areas are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. As used herein the term "modal" route refers to a route that is popular or otherwise frequently observed (e.g., above a threshold value of observations) to have been taken by travelers.

Figure 1:
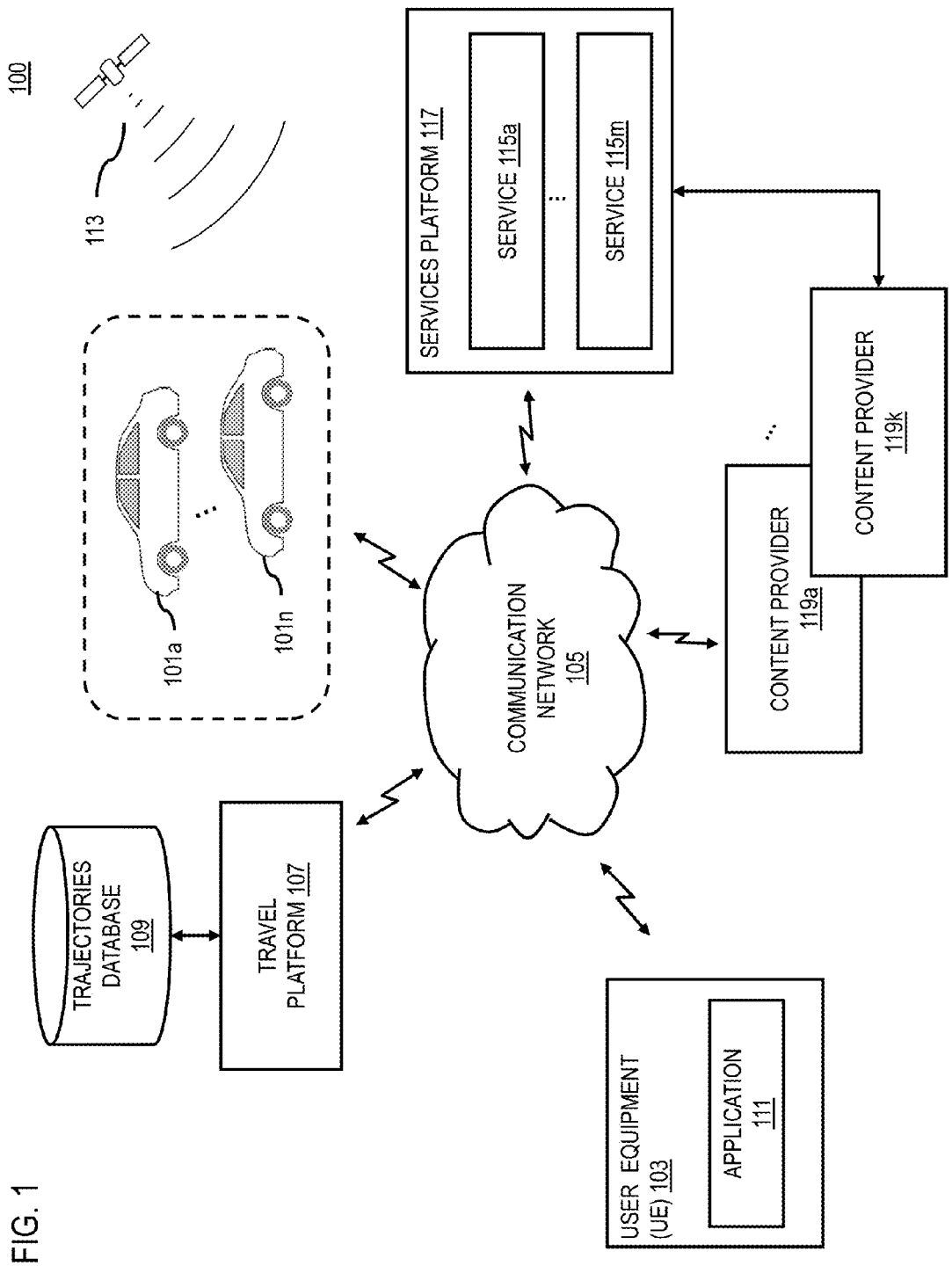
FIG. 1 is a diagram of a system capable of determining one or more modal routes between one or more origin areas and one or more destination areas based on trajectory data, according to one embodiment.

FIG. 1 is a diagram of a system capable of determining one or more modal routes between one or more origin areas and one or more destination areas based on trajectory data, according to one embodiment. Service providers can easily define which route is the fastest route from an origin point to a destination point and as well as the "best" route according to other parameters such as traffic, toll fares, topography, and the like. However, a more difficult task is defining the modal route (i.e., the route that most or a significant number of people actually took) between an origin area and a destination area for any level of granularity of distance and/or area based on actual driver behavior. For example, service providers may want to detect anomalies such as why people are not taking the calculated route (e.g., a traditionally calculated route based on the fastest route, shortest route, and/or any other traditional routing parameter). In one embodiment, these anomalies may, for instance, indicate an underlying issue that is occurring only with the route (e.g., ongoing construction or an error in the map), and/or an underlying error or deficiency in a routing algorithm.

To address this problem, a system 100 of FIG. 1 introduces the capability to determine the routes that most people took to get from one or more origin areas to one or more destination areas (i.e., the modal routes) using recorded travel trajectories or probe data. In one embodiment, the system 100 can present the modal routes (e.g., top three most popular routes) to a user (e.g., as alternate or recommended routes), or can use the determined modal routes to detect anomalies as discussed above. In one embodiment, given a time range and inputs such as origin and destination points, input radius for each of these points, and the number of desired modal routes, the system 100 can retrieve recorded travel trajectories or probe data from probes traveling through the origin area and destination area during the specified time range. The system 100 then clusters the retrieved trajectories using a clustering means (e.g., a distance cost-metric clustering means) to determine one or more modal routes (e.g., routes corresponding to trajectory clusters with trajectory counts above a threshold or that are the most numerous). In one embodiment, if the modal routes differ for an expected route (e.g., a traditionally calculated fastest or shortest route), the system 100 may infer that there is an anomaly occurring in the calculated route. For example, if a main or calculated route is not among the modal routes determined from the probe data, there may be a potential anomaly occurring along that route (e.g., the number of vehicular road lanes may have been reduced to promote the use of cycling between two prominent areas of a large metropolitan city resulting in an increase in average journey time).

As shown in FIG. 1, the system 100 comprises one or more vehicles 101a-101n (also collectively referred to as vehicles 101) and/or one or more user equipment devices (UEs) 103 that act as probes traveling over a road network. Although the vehicles 101 are depicted as automobiles, it is contemplated that the vehicles 101 can be any type of transportation vehicle manned or unmanned (e.g., planes, aerial drone vehicles, motor cycles, boats, bicycles, etc.), and the UEs 103 can be associated with any of the types of vehicles or a person or thing traveling through the one or more origin areas and the one or more destination areas. In one embodiment, each vehicle 101 and/or UE 103 is assigned a unique probe identifier (probe ID) for use in reporting or transmitting probe data collected by the vehicles 101 and UEs 103. The vehicles 101 and UEs 103, for instance, are part of a probe-based system for collecting probe data for monitoring traffic conditions in a transportation network graph. In one embodiment, each vehicle 101 and/or UE 103 is configured to report probe data as probe points, which are individual data records collected at a point in time that records telemetry data for that point in time. The probe points can be collected by the system 100 from the vehicles 101 and/or UEs 103 in real-time, in batches, continuously, or at any other frequency requested by the system 100 over, for instance, the communication network 105 for processing by the traffic platform 107.

In one embodiment, the system 100 queries a trajectory database to retrieve one or more trajectories that contain one or more probe points located within one or more origin areas and one or more destination areas. By way of example, when using the system 100 to evaluate potential traffic patterns within an area (e.g. a city center), the one or more origin areas could be a popular area of a large metropolitan city (e.g., Hyde Park in London) or the one or more origin areas could be one or more distribution centers of a large retail enterprise. Similarly, the one or more destination areas could be a second popular area of the large metropolitan city (e.g., Tower Hill in London) or the one or more destination areas could be the delivery locations of the large retail enterprise's customers. In one embodiment, the one or more probe points are collected from one or more sensors or a plurality of devices (e.g., the vehicles 101 and/or UEs 103) traveling through the one or more origin areas and the one or more destination areas. In one embodiment, a user may be walking or running through the one or more origin areas and the one or more destination areas (e.g., carrying or holding a UE 103). In one embodiment, a probe point can include attributes such as a heading, a speed, a time, or a combination thereof of each of the plurality of devices. The list of attributes is provided by way of illustration and not limitation. It is contemplated that any combination of these attributes or other attributes may be recorded as a probe point. In one embodiment, the vehicles 101 may include sensors for reporting measurements and/or reporting attributes. The attributes can also be any attribute normally collected by an on-board diagnostic (OBD) system of the vehicle, and available through an interface to the OBD system (e.g., OBD II interface or other similar interface).

In one embodiment, the system 100 receives an input (e.g., from a user) specifying one or more origin points, one or more destination points, one or more origin radii centered on the one or more origin points, and one or more destination radii centered on the one or more destination points, respectively. In one embodiment, the system 100 receives as an input probe trajectories with the origin and destination points along with an acceptance radius of each of them. Consequently, the system 100 can determine not only the most popular routes between two points, but also for the most popular routes between two areas. In one embodiment, the one or more origin areas and the one or more destination areas are defined by the input. In one embodiment, a user is free to select any radius size on a map as the origin radius and any radius size on a map as the destination radius and it is completed that the radius sizes may or may not be the same.

In one embodiment, once the system 100 retrieves the one or more trajectories, the system 100 trims the one or more trajectories based on the one or more origin areas and the one or more destination areas and keeps only the part of the one or more trajectories or trips that go from an origin area to a destination area. By way of example, trimming refers to cutting or removing the portions of the trajectories that occur before the origin area or after the destination area. In this way, only the relevant portions of the trajectories occurring between the origin area and the destination are processed by the system 100, thereby advantageously reducing the computing resources needed to process the trajectories. In one embodiment, the system 100 trims the one or more trajectories prior to clustering the one or more trajectories, presenting at least one of the one or more trajectory clusters as the one or more modal routes, or a combination thereof. In one embodiment, the system 100 trims the one or more trajectories using the example pseudocode provided in Table 1 below. It is noted that the example pseudocode of Table 1 is provided for illustration and is not intended as a limitation.

TABLE 1

```
var trips = // All the Trips Retrieved From the Database
var trimmedTrips = [ ]; // Container for all the resulting
trimmed trips
for (trip in trips) {
    var beforeOrigin = true;
    var afterDestination = false;
    var trimmedTrip = {id: trip.id, probes:[ ]};
    for (probe in trip.probes) {
        if ( isInsideOrigin(probe)) {
            beforeOrigin = false;
        }
        if (!beforeOrigin && !afterDestination) {
            trimmedTrip.probes.push(probe);
        }
        if ( isInsideDestination(probe)) {
            afterDestination = true;
        }
    }
    if (trimmedTrip.probes.length > 0) {
        trimmedTrips.push(trimmedTrip);
    }
}
```

In one embodiment, to further reduce computer resource requirements, the system 100 can optionally generate simplified versions of the trajectories for subsequent processing (e.g., clustering, etc.). For example, once the system 100 has determined all of the one or more trajectories that went from the one or more origin areas to the one or more destination areas, the system 100 can process the one or more determined trajectories to reduce the sinuosity of the one or more trajectories to generate respective one or more simplified trajectories. By way of example, sinuosity refers to the number of curves, turns, bends, changes of directions, etc. that may occur in the retrieved trajectories. A high level of sinuosity increases the complexity of a trajectory, thereby also increasing the computing resources needed to perform the subsequent clustering. In one embodiment, when computing resources are limited or the system 100 is otherwise configured to operate in a less computationally intensive mode, the system 100 processes the one or more determined trajectories to reduce the complexity and sinuosity of the trajectories and to generate simplified versions of the trajectories. In this way, subsequent processing of the simplified trajectories in place of the original trajectories can make the subsequent clustering computations use less computer resources and decrease computational time. However, in one embodiment, the system 100 can cluster the one or more trajectories into one or more trajectory clusters without first generating the one or more simplified trajectories.

In one embodiment, the system 100 reduces the sinuosity of the one or more trajectories by reducing a number of turns occurring in each of the one or more trajectories. In one embodiment, the system 100 simplifies the one or more trajectories using the Ramer-Douglas-Peucker algorithm provided in Table 2. It is noted that the Ramer-Douglas-Peucker algorithm of Table 2 is provided for illustration and is not intended as a limitation.

TABLE 2

```
function RamerDouglas(trip) {
    // Keep end and start
    trip[0].keep = true;
    trip[trip.length - 1].keep = true;
    // check if the line is a good approximation
    var probe;
    var maxDist = 0, maxI = 0;
    var dist;
    for (var i in trip) {
        probe = trip[i];
        dist = distancePointFromLine(probe, trip[0],
trip[trip.length - 1])
        if (dist > maxDist) {
            maxDist = dist;
            maxI = i;
        }
    }
    if (maxDist > RAMER_DOUGLAS_DIST) {
        RamerDouglas(trip.slice(0,maxI));
        RamerDouglas(trip.slice(maxI,trip.length));
    }
    var res=[ ];
    for (var i in trip) {
        if (trip[i].keep === true) {
            res.push(trip[i]);
        }
    }
    return res;
}
```

In one embodiment, the distancePointFromLine used in Ramer-Douglas-Peucker algorithm by the system 100 is actually the two-dimensional (2D) version limited to just latitudes and longitudes to provide an approximation or simplification of the original trajectory. Notably, with this implementation, the longitude is acquiring more value than what it is supposed to have for geometrical reasons. Also, the Ramer-Douglas-Peucker algorithm of Table 2 has a parameter: the distance from the overall direction that a point needs to have in order to be considered a major turning point. In one embodiment, the system 100 can tune this distance on the distance between the origin area and the destination area since the significance of a turning point is related to that distance. In one embodiment, it is contemplated that a three-dimensional simplification algorithm can be used that accounts for latitude, longitude, and altitude to more closely approximate the original trajectory (e.g., wherein the trajectories or routes undergo significant altitude changes).

In one embodiment, once the system 100 generates the respective one or more simplified trajectories, the system 100 clusters the one or more or more simplified trajectories into one or more simplified trajectory clusters based on a distance. As previously stated above, in one embodiment, the system 100, with enough computation resources and/or time can run the k-medoids algorithm with the one or more original trajectories rather than the one or more simplified trajectories. In one embodiment, the system 100 uses the distance cost-metric algorithm (e.g., a k-medoids algorithm) to cluster the one or more trajectories or the one more simplified trajectories. One example of such a distance cost-metric algorithm uses the Hausdorff distance for the distance function. In one embodiment, the distance function is defined by the example code provided below in Table 3. It is noted that the example code of Table 3 is provided for illustration and is not intended as a limitation. In one embodiment, the system 100 uses the Voronoi iterations method to determine the k clusters that minimize the intra-cluster distance from the medoid, where the medoid is the element inside the cluster with the minimum sum of distances from the other elements in the cluster.

TABLE 3

```
double hausdorffDistance(Trajectory lhs, Trajectory rhs) {
    double max = 0;
    for (size_t i = 0; i < lhs.probes.size( ); i++) {
        Location probe = lhs.probes[i];
        double inf = infimum(probe, rhs);
        if (inf > max) {
            max = inf;
        }
    }
    for (size_t i = 0; i < rhs.probes.size( ); i++) {
        Location probe = rhs.probes[i];
        double inf = infimum(probe, lhs);
        if (inf > max) {
            max = inf;
        }
    }
    return max;
}
double infimum(Location loc, Trajectory traj) {
    if (traj.probes.size( ) < 1) {
        return 0;
    }
    double min = distance(loc, traj.probes[0]);
    for (size_t i = 0; i < traj.probes.size( ); i++) {
        double dist = distance(loc, traj.probes[i]);
        if (dist < min) {
            min = dist;
        }
    }
    return min;
}
```

In one embodiment, the system 100 determines respective counts of the one or more trajectories within each of the one or more trajectory clusters. In one embodiment, the system 100 determines the respective counts based on either the original trajectories or the one or more simplified trajectories (if simplification is used) within each of the one or more trajectory clusters. As discussed above, depending on the computational resources and time, the system 100 may cluster the original trajectories or the simplified trajectories to determine the respective counts. In one embodiment, the k-medoids algorithm used by the system 100 will return the k most popular trajectories (e.g., original or simplified trajectories) along with a relative volume attribute (e.g., the respective trajectories counts) for each one of the trajectories. As previously described, in one embodiment, the system 100 can use the Voronoi iterations method to determine the k clusters that minimize the intracluster distance from the medoid. The system 100 then determines the respective trajectory counts for just the determined k clusters.

In one embodiment, the system 100 selects the one or more trajectory clusters as the one or more modal routes based on the determined respective counts of the one or more trajectories (e.g., original or simplified). In one embodiment, a trajectory cluster that has a high count (e.g., above a threshold or a top n highest count) of the one or more trajectories or the one or more simplified trajectories corresponds to a popular route between the one or more origin areas and the one or more destination areas. In one embodiment, if the system 100 simplified the trajectories for clustering, the system 100 can retrieve the original trajectory corresponding to the simplified trajectory for presentation to the user. In one embodiment, the simplified trajectories are used only internally by the system 100 to reduce computational resource requirements and computing time, and are not exposed to external users. For example, the system 100 retrieves the one or more trajectories (e.g., from a trajectory database) corresponding to the one or more simplified trajectories in the selected one or more trajectory clusters to present (e.g., to a user and/or a UE 103). In one embodiment, the system 100 again trims the one or more trajectories using the example pseudocode of Table 1 prior to the presentation. It is contemplated that in the embodiment where there the one or more trajectories are not simplified, the system 100 would not need to perform the aforementioned retrieval and trimming steps.

In one embodiment, the system 100 presents at least one of the one or more trajectory clusters as the one or more modal routes based on the respective counts. In addition or alternatively, the system 100 need not present the modal routes to users. Instead, the modal routes may be used for anomaly detection or otherwise to characterize the routes (e.g., for traffic planning purposes). By way of example, the one or more modal routes could identify within a traffic network graph that during the nighttime, the most popular route is not the same as the most popular route during the day (e.g., due to construction or repairs performed at night).

In one embodiment, the system 100 determines a representative trajectory for each of the one or more trajectory clusters presented as the one more modal routes, wherein the representative trajectory represents each of the one or more modal routes. In other words, instead of presenting an entire cluster of trajectories as the modal route, the system 100 can determine one trajectory within each cluster to represent the respective modal route. For example, in one embodiment, the representative trajectory is a selected one of the one or more trajectories in each cluster with a minimum sum of distances from other trajectories in each cluster (e.g., the one or more trajectories represented by the medoid). In another embodiment, the representative trajectory can be a trajectory calculated from other trajectories in the cluster (e.g., a mean trajectory or other aggregated trajectory). In one embodiment, the difference between the one or more trajectory clusters, the one or more trajectories, or the one or more representative trajectories presented by the system 100 is degree of granularity relative to the one or more routes that most people took in order to get from the one or more origin areas to the one or more destination areas.

In one embodiment, the system 100 calculates a journey time (JT), a volume, a sinuosity, or a combination thereof associated with the one or more modal routes. In one embodiment, the various metrics can be retrieved by the system 100 from each of the k clusters returned by the clustering of the one or more trajectories or the one or more simplified trajectories. In one embodiment, the system 100 presents the JT, the volume, the sinuosity, or a combination thereof in a user interface (e.g., a UE 103) in association with the one or more modal routes.

As shown in FIG. 1 and described above, the vehicles 101 and UEs 103 of system 100 are part of a probe data collection system that transmits or otherwise collects probe data for processing by the travel platform 107 over the communication network 105. The travel platform 107 performs the processes for determining one or more modal routes between one or more origin areas and one or more destination areas based on trajectory data as discussed with respect to the various embodiments described herein. In one embodiment, the travel platform 107 can be a standalone server or a component of another device with connectivity to the communication network 105. For example, the component can be part of an edge computing network where remote computing devices (not shown) are installed along or within proximity of a road network to provide trajectory data collected locally or within a local area served by the remote or edge computing device.

In one embodiment, the travel platform 107 has connectivity or access to a geographic database 109 that includes mapping data about a transportation network (additional description of the geographic database 109 is provided below with respect to FIG. 2). In one embodiment, the probe data can also be stored in the geographic database 109 by the travel platform 107. In addition or alternatively, the probe data can be stored by another component of the system 100 in the geographic database 109 for subsequent retrieval and processing by the travel platform 107.

In one embodiment, the vehicles 101 and/or UEs 103 may execute an application 111 to present or use the one or more modal routes. For example, if the application 111 is a navigation application then the one or more modal routes (and the possible maneuvers they represent) can be used to determine routing information, provide updated estimated times of arrival (ETAs), provide notifications of construction, provide notifications of potentially problematic areas/intersections/interchanges, and the like.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with a vehicle 101 (e.g., cars), a component part of the vehicle 101, a mobile device (e.g., phone), and/or a combination of thereof. Similarly, the vehicle 101 may include computing components that can be perform all or a portion of the functions of the UE 103.

By way of example, the application 111 may be any type of application that is executable at the vehicle 101 and/or the UE 103, such as mapping applications, location-based service applications, navigation applications, content provisioning services, camera/imaging applications, media player applications, social networking applications, calendar applications, and the like. In one embodiment, the application 111 may act as a client for the travel platform 107 and perform one or more functions of the travel platform 107 alone or in combination with the travel platform 107.

In one embodiment, the vehicles 101 and/or the UEs 103 are configured with various sensors for generating probe data. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or UEs 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 101 and/or UEs 103 may include GPS receivers to obtain geographic coordinates from satellites 113 for determining current location and time associated with the vehicle 101 and/or UE 103 for generating probe data. Further, the location can be determined by a triangulation system such as A-GPS, Cell of Origin, or other location extrapolation technologies.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the travel platform 107 may be a platform with multiple interconnected components. The travel platform 107 may include multiple servers, intelligent networking devices, computing devices, components and corresponding software for determining one or more modal routes between one or more origin areas and one or more destination areas based on trajectory data. In addition, it is noted that the travel platform 107 may be a separate entity of the system 100, a part of the one or more services 115*a*-115*m* (collectively referred to as services 115) of the services platform 117, or included within the UE 103 (e.g., as part of the applications 111).

The services platform 117 may include any type of service 115. By way of example, the services 115 may include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 may interact with the travel platform 107, the UE 103, and/or the content provider 119 to provide the services 115.

In one embodiment, the content providers 119*a*-119*k* (collectively referred to as content providers 119) may provide content or data to the vehicles 101 and/or UEs 103, the travel platform 107, and/or the services 115. The content provided may be any type of content, such as textual content, audio content, video content, image content, etc. In one embodiment, the content providers 119 may provide the one or more trajectories that contain one or more probe points located within the one or more origin areas and the one or more destination areas. In one embodiment, the content providers 119 may also store content associated with the vehicles 101, the UE 103, the travel platform 107, and/or the services 115. In another embodiment, the content providers 119 may manage access to a central repository of data, and offer a consistent, standard interface to data, such as a trajectory database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques or processes for retrieving and/or accessing trajectory or probe data from one or more sources may be employed by the travel platform 107.

By way of example, the vehicles 101, the UEs 103, the travel platform 107, the services platform 117, and the content providers 119 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
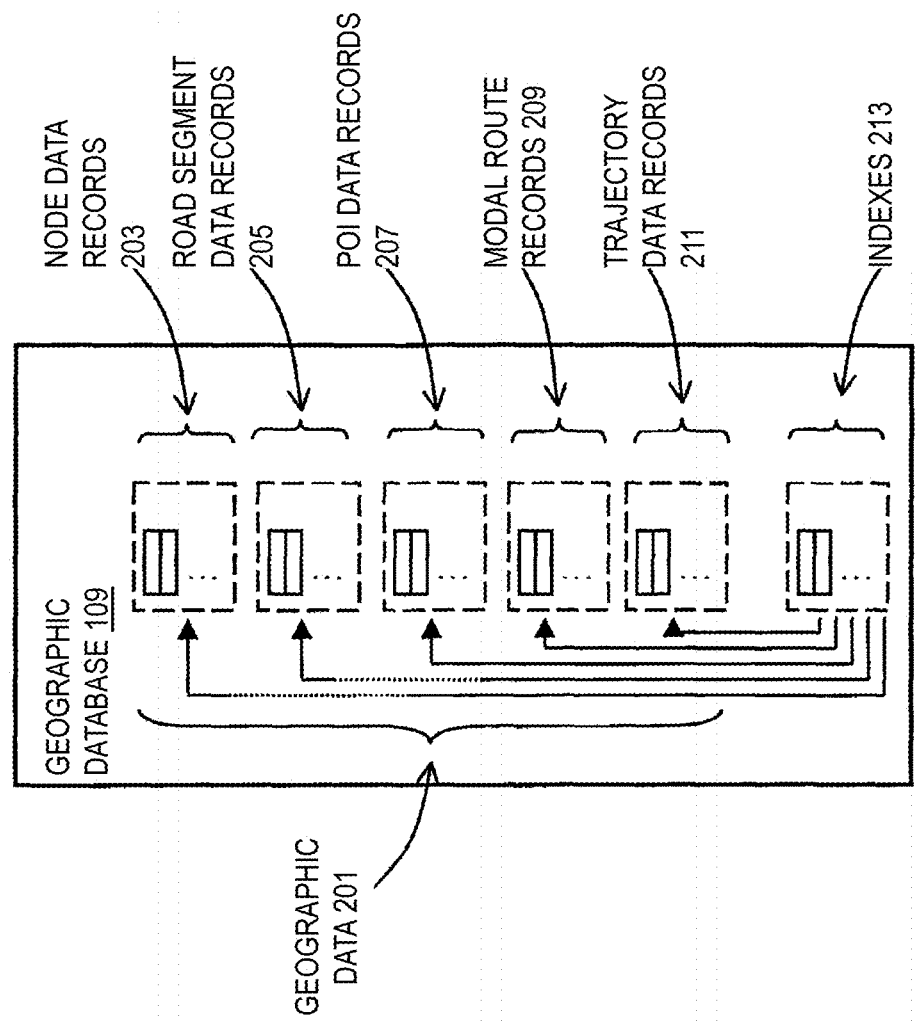
FIG. 2 is a diagram of a geographic database, according to one embodiment.

FIG. 2 is a diagram of the geographic database 109 of system 100, according to exemplary embodiments. In the exemplary embodiments, modal routes, original trajectories, trimmed trajectories, simplified trajectories, and/or other related information can be stored, associated with, and/or linked to the geographic database 109 or data thereof. In one embodiment, the geographic database 109 includes geographic data 201 used for (or configured to be compiled to be used for) mapping and/or navigation-related services, such as for personalized route determination, according to exemplary embodiments. For example, the geographic database 109 includes node data records 203, road segment or link data records 205, POI data records 207, modal route records 209, and trajectory data records 211, for example. More, fewer or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for determination of one or more personalized routes, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 207. The geographic database 109 can also include data about places, such as cities, towns, or other communities, and other geographic features, such as bodies of water, mountain ranges, etc. Such place or feature data can be part of the POI data records 207 or can be associated with POIs or POI data records 207 (such as a data point used for displaying or representing a position of a city).

In addition, the geographic database 109 can include data about determined modal routes and their respective origin and destination locations in the modal route records 209. By way of example, modal routes for different time periods and contexts (e.g., season, day of the week, time of day, mode of transportation, etc.) can be determined according the various embodiments described herein and stored in the modal route records 209 for subsequent retrieval or access. In addition, trajectory and/or probe data processed by the system 100 can be stored in the trajectory data records 211. For example, trimmed or simplified trajectories can be stored in the trajectory data records 211 for later retrieval or access.

The geographic database 109 can be maintained by the content provider 119 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., vehicle 101, UE 103, etc.) to provide navigation-related functions. For example, the geographic database 109 can be used with the end user device to provide an end user with navigation features. In such a case, the geographic database 109 can be downloaded or stored on the end user device (e.g., vehicle 101, UE 103, etc.), such as in application 111, or the end user device can access the geographic database 109 through a wireless or wired connection (such as via a server and/or the communication network 105), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use the device navigation functions such as guidance and map display, for example, and for determination of route information to at least one identified point of interest, according to exemplary embodiments.

Figure 3:
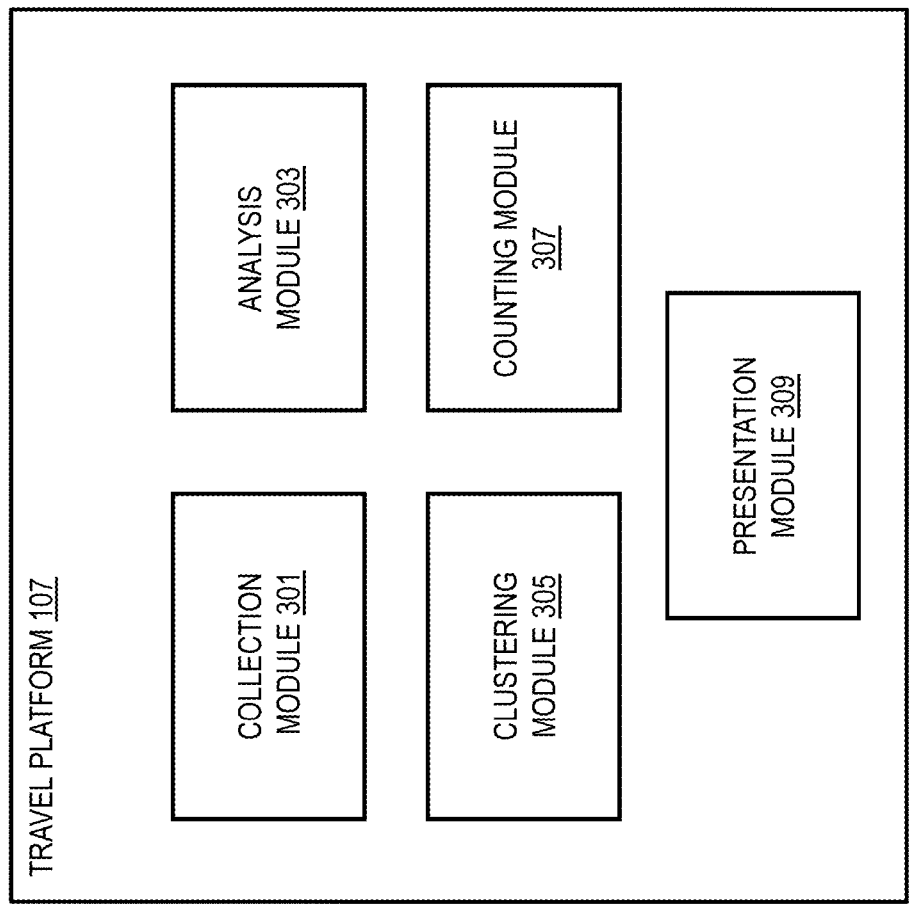
FIG. 3 is a diagram of the components of a travel platform, according to one embodiment.

FIG. 3 is a diagram of the components of the travel platform 107, according to one embodiment. By way of example, the travel platform 107 includes one or more components for determining one or more modal routes between one or more origin areas and one or more destination areas based on trajectory data. It is contemplated that the functions of these components may be combined in one or more components or performed by other components of equivalent functionality. In this embodiment, the travel platform 107 includes a collection module 301, an analysis module 303, a clustering module 305, a counting module 307, and a presentation module 309.

In one embodiment, the collection module 301 may query a trajectory database to retrieve one or more trajectories that contain one or more probe points located within the one or more origin areas and the one or more destination areas. In one embodiment, the one or more probe points are collected from one or more sensors of a plurality of devices traveling through the one or more origin areas and the one or more destination areas. In one embodiment, the collection module 301 is configured to collect the probe data through the one or more origin areas and the one or more destination areas for a specified time range. In one embodiment, the one or more probe points indicate a position, a heading, a speed, a time, or a combination thereof of each of the plurality of devices (e.g., the vehicle 101 and/or the UEs 103). In one embodiment, the collection module 301 can also receive an input specifying one or more origin points, one or more destination points, one or more origin radii centered on the one or more origin points, and one or more destination radii centered on the one or more destination points. In one embodiment, a user of the system 100 is free to select any radius size on a map as an origin area and any radius size as a destination area and it is contemplated that the respective radii may be the same or they may be different. In one embodiment, if the analysis module 303 simplified the one or more trajectories for clustering, then the collection module 301 also may retrieve the one or more trajectories corresponding to the one or more simplified trajectories in the selected one or more trajectory clusters to present (e.g., in a UE 103). In one embodiment, the collection module 301 retrieves the one or more trajectories in their non-simplified version from a trajectory database.

In one embodiment, the analysis module 303 may trim the one or more trajectories based on the one or more origin areas and the one or more destination areas prior to generating the one or more simplified trajectories, clustering the one or more trajectories, presenting at least one of the one or more trajectory clusters as the one or more modal routes, or a combination thereof. In one embodiment, the analysis module 303 trims the one more trajectories and keeps only the part of the one or more trajectories or trips that goes through the one or more origin areas and the one or more destination areas using the pseudocode provided above in Table 1. In this way, only the relevant portions of the one or more trajectories occurring between the one or more origin areas and the one or more destination areas are processed by the clustering module 305, thereby advantageously reducing the computer resources needed to process the trajectories. In one embodiment, to further reduce computer resource requirements, the analysis module 303 may also process the one or more trajectories to reduce the sinuosity of the one or more trajectories to generate respective one or more simplified trajectories. By way of example, sinuosity refers to the numbers of curves, turns, bends, changes of direction, etc. that may occur in the retrieved trajectories. A high level of sinuosity increases the complexity of a trajectory, thereby also increasing the computer resources needed by the clustering module 305 to perform the clustering. In one embodiment, the analysis module 303 reduces the sinuosity of the one or more trajectories by reducing the number of turns occurring in the one or more trajectories (i.e., simplifying the one or more trajectories to their major turning points). In one embodiment, the analysis module 303 simplifies the one or more trajectories using the Ramer-Douglas-Peucker algorithm provided above in Table 2. By way of example, the simplification by the analysis module 303 reduces the computational intensity of the distance metric function and therefore enables the computation of the one or more trajectories (e.g., by the clustering module 305) to end in a reasonable time.

In one embodiment, the analysis module 303 also may select the one or more trajectory clusters as the one or more modal routes based on the determined respective counts of the one or more trajectories (e.g., original or simplified). In one embodiment, the analysis module 303 selects the one or more trajectory clusters that has the highest respective counts of the one or more simplified trajectories (e.g., above a threshold or a top n highest count). In one embodiment, the analysis module 303 may also determine a representative trajectory for each of the one or more trajectory clusters presented as the one or more modal routes. In other words, instead of presenting an entire cluster of trajectories as the modal route, the analysis module 303 can determine one trajectory within each cluster to represent the respective module route. In one embodiment, the analysis module 303 may use the Voronoi iterations method to find the k clusters that minimize the intracluster distance from the medoid, where the medoid is the element inside the cluster with the minimum sum of distances from the other elements in the cluster. In another embodiment, the representative trajectory can be a trajectory calculated from other trajectories in the cluster (e.g., a mean trajectory or other aggregated trajectories). In one embodiment, the analysis module 303 also may calculate a journey time, a volume, a sinuosity, or a combination thereof associated with the one or more modal routes. In one embodiment, the analysis module 303 retrieves the other metrics/information from each of the k clusters returned by the cluster module 305.

In one embodiment, with sufficient computational resources and/or time, the cluster module 305 may cluster the one or more trajectories (i.e., original trajectories) into one or more trajectory clusters based on a distance (e.g., the Hausdorff distance). In one embodiment, the cluster module 305 clusters the one or more original trajectories or the one or more simplified trajectories using the distance-cost metric algorithm (e.g., a modified version of the k-medoids algorithm) to cluster the one or more trajectories or the one or more simplified trajectories. One example of such a distance cost-metric algorithm uses the Hausdorff distance as provided above in Table 3 as the distance function of the k-medoid algorithm.

In one embodiment, the counting module 307 may determine respective counts of the one or more trajectories within each of the one or more trajectory clusters. In one embodiment, the counting module 307 determines the respective counts based on either the original trajectories or the one or more simplified trajectories (if simplification is used) within each of the one or more trajectory clusters. In one embodiment, the k-medoids algorithm used by the clustering module 305 can return the k most popular trajectories (e.g., original or simplified trajectories) along with a relative volume attribute for each one of them (e.g., the respective trajectory counts). In one embodiment, the counting module 307 may also determine respective counts using the Voronoi iterations method. The counting module 307 then determines the respective trajectory counts for just the determined k clusters.

In one embodiment, the presentation module 309 may present at least one of the one or more trajectory clusters as the one or more modal routes based on the respective counts. In addition or alternatively, the presentation module 309 need not present the modal routes to users. Instead, the modal routes may be used for anomaly detection or otherwise to characterize the routes (e.g., for traffic planning purposes). In one embodiment, a user may input a number of module routes that he or she is looking for so if this number is one, the presentation module 309 will present to the user (e.g., through a UE 103) the single most popular route. In one embodiment, the presentation module 309 also may present the journey time, the volume, the sinuosity, or a combination thereof in a user interface (e.g., a UE 103) in association with the presentation of the one or more modal routes.

Figure 4:
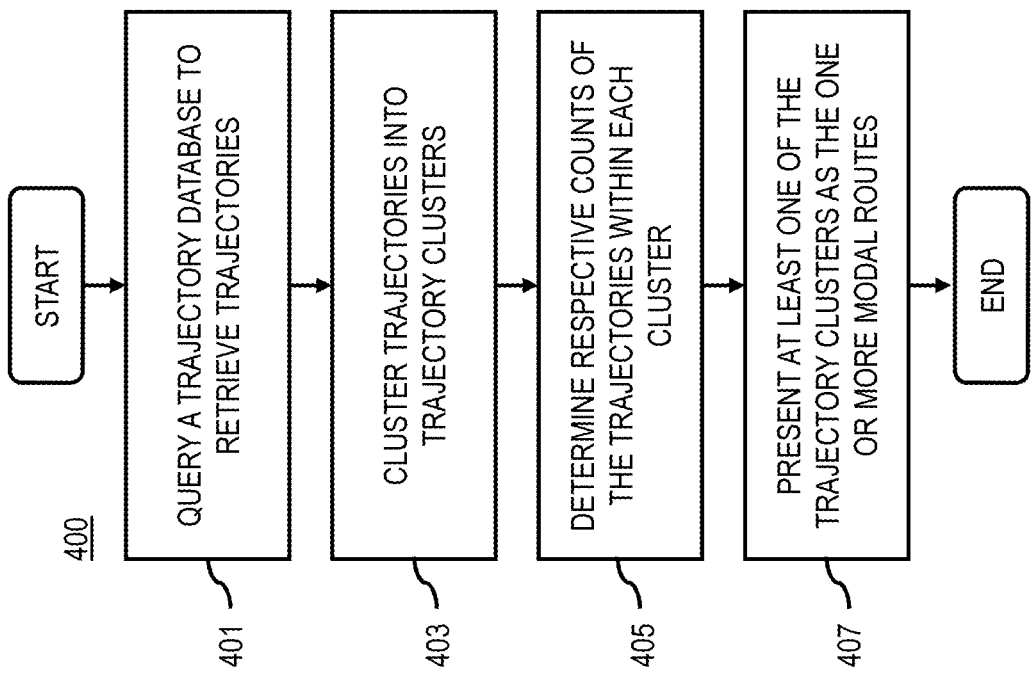
FIG. 4 is a flowchart of a process for determining one or more modal routes between one or more origin areas and one or more destination areas based on trajectory data, according to one embodiment.
Figure 15:
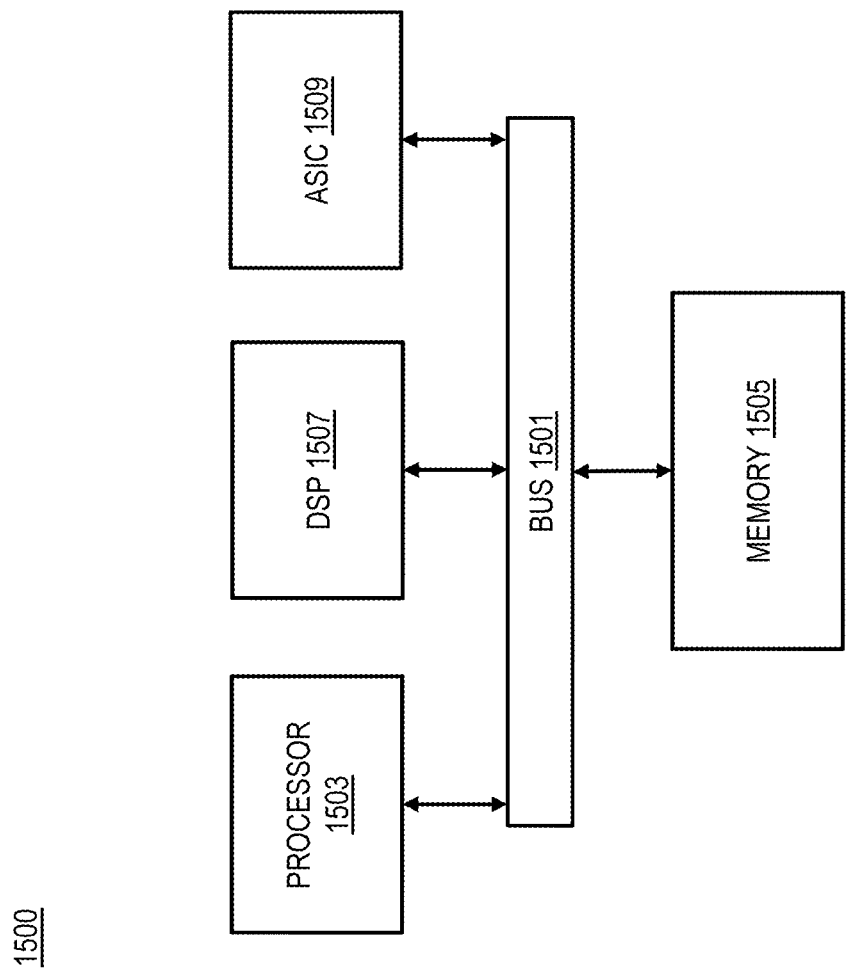
FIG. 15 is a diagram of a chip set that can be used to implement an embodiment of the invention.

FIG. 4 is a flowchart of a process for determining one or more modal routes between one or more origin areas and one or more destination areas based on trajectory data, according to one embodiment. In one embodiment, the travel platform 107 performs the process 400 and is implemented in, for instance, a chip set including a processor and a memory as shown in FIG. 15.

In step 401, the travel platform 107 queries a trajectory database to retrieve one or more trajectories that contain one or more probe points located within the one or more origin areas and the one or more destination areas. In one embodiment, the one or more probe points are collected from one or more sensors of a plurality of devices (e.g., vehicles 101, UEs 103, etc.) traveling through the one or more origin areas and the one or more destination areas. By way of example, when using the travel platform 107 to evaluate potential traffic patterns within an area (e.g., a city center) the one or more origin areas could be a popular area of a large metropolitan city (e.g., Hyde Park in London), one or more distribution centers of a popular retail enterprise, or one or more points of entry of a city (e.g., bridges or tunnels). Likewise, the one or more destination areas could be a nearby popular area of the large metropolitan city (e.g., Tower Hill), the delivery locations of the retail enterprise's customers, or one or more entertainment or sport venues (e.g., various venues used during an Olympics). As previously discussed, the one or more probe points may indicate a position, a heading, a speed, a time, or combination thereof of each of the plurality of devices.

In step 403, the travel platform 107 clusters the one or more trajectories into one or more trajectory clusters based on a distance (e.g., the Hausdorff distance). In one embodiment, the clustering of the one or more trajectories by the travel platform 107 comprises clustering the one or more simplified trajectories in place of the one or more trajectories. In one embodiment, the travel platform 107 may cluster the one or more trajectories without first simplifying the one or more trajectories (e.g., given sufficient computational resources and/or time). In one embodiment, the travel platform 107 clusters the one or more trajectories or the one or more simplified trajectories using a distance cost-metric algorithm (e.g., a modified version of the k-medoids algorithm). One example of such a distance cost-metric algorithm uses the Hausdorff distance as the distance function. In one embodiment, the travel platform 107 uses the Voronoi iterations method to determine the k clusters that minimize the intracluster distance from the medoid, where the medoid is the element inside the cluster with the minimum sum of distances from the other elements in the cluster.

In step 405, the travel platform 107 determines respective counts of the one or more trajectories within each of the one or more trajectory clusters. In one embodiment, the k-medoids algorithm used by the travel platform 107 returns the k most popular trajectories (e.g., original or simplified) along with a relative volume or count attribute for each of them. In one embodiment, the travel platform 107 counts the one or more trajectories within each Voronoi cell after the travel platform 107 uses the Voronoi iterations method to find the k clusters that minimize the intracluster distance from the medoid. The travel platform 107 then determines the respective trajectory counts for just the determined k clusters.

In step 407, the travel platform 107 presents at least one of the one or more trajectory clusters as the one or more modal routes based on the respective counts. By way of example, the one or more modal routes represent the one or more most popular routes, the one or more major routes, the or more main routes, or a combination thereof between the one or more origin areas and the one or more destination areas. In one embodiment, the travel platform 107 presents the one or more trajectory clusters to a user through a user interface (e.g., an in-dash infotainment system or a UE 103 such as a handheld device or smartphone). In addition or alternatively, the travel platform 107 need not present the modal routes to users. Instead, the modal routes may be used by the travel platform 107 for anomaly detection or otherwise to characterize the routes (e.g., for traffic planning purposes).

Figure 5:
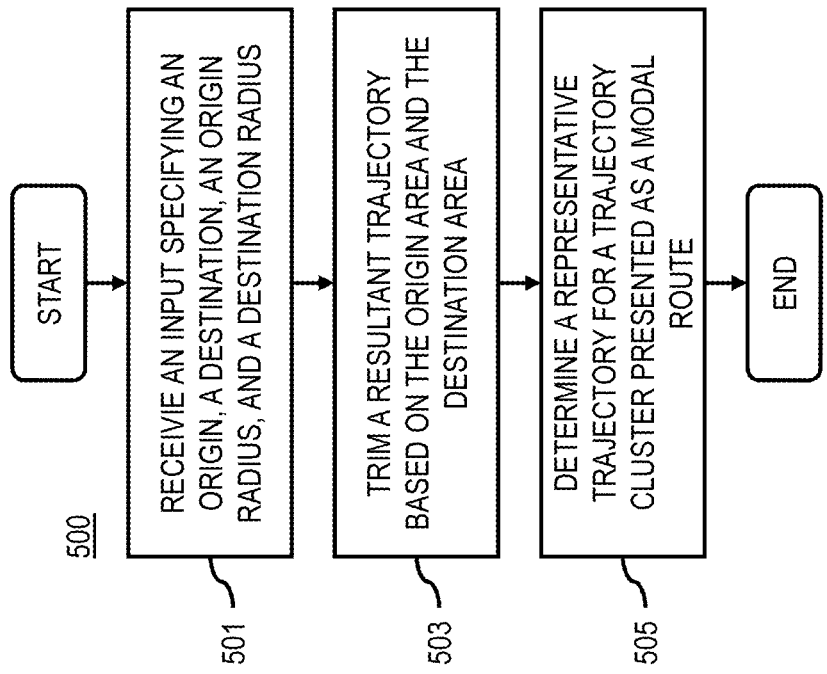
FIG. 5 is a flowchart of a process for retrieving, trimming, and representing the one or more trajectories, according to one embodiment.

FIG. 5 is a flowchart of a process for retrieving, trimming, and representing the one or more trajectories, according to one embodiment. In one embodiment, the travel platform 107 performs the process 500 and is implemented in, for instance, a chip set including a processor and a memory as shown in FIG. 15.

In step 501, the travel platform 107 receives an input specifying one or more origin points, one or more destination points, one or more origin radii centered on the one or more origin points, and one or more destination radii centered on the one or more destination points. In one embodiment, the travel platform 107 determines the one or more origin areas and the one or more destination areas based on the input (e.g., from a user). In one embodiment, the travel platform 107 receives as input one or more probe trajectories with the origin and destination points, along with an acceptance radius for each of them. In one embodiment, a user is free to select any radius size on a map as the origin radius and any radius size as the destination radius. In one embodiment, the travel platform 107 also receives an input specifying the number of modal routes that a user is looking for, so if this number is one, for example, the result of the computation by the travel platform 107 will be the single most popular route. In one embodiment, it is contemplated that the travel platform 107 will receive an input of a single origin to a single destination, a single origin to multiple destinations, multiple origins to a single destination, or multiple origins to multiple destinations.

In step 503, the travel platform 107 trims the one or more trajectories based on the one or more origin areas and the one or more destination areas prior to the generating the one or more simplified trajectories, the clustering of the one or more trajectories, the presenting of the at least one of the one or more trajectory clusters as the one or more modal routes, or a combination thereof. In one embodiment, once all of the one or more trajectories are retrieved, the travel platform 107 trims the one or more retrieved trajectories and keeps only the part of the one or more trajectories or trips that go from the origin area to the destination area. By way of example, trimming refers to cutting or removing the portions of the trajectories that occur before the origin area or after the origin area. In this way, only the relevant portions of the trajectories occurring between the origin area and the destination area are processed by the travel platform 107, thereby advantageously reducing the computing resources needed to process the trajectories. In one embodiment, the travel platform 107 trims the one or more trajectories using the example pseudocode provided above in Table 1. In one embodiment, once the travel platform 107 returns the one or more trajectories corresponding to the one or more clustered simplified trajectories, the travel platform 107 again trims the one or more trajectories using the example pseudocode described in Table 1.

In step 505, the travel platform 107 determines a representative trajectory for each of the one or more trajectory clusters presented as the one or more modal routes, wherein the representative trajectory represents each of the one or more modal routes. In other words, instead of presenting an entire cluster of trajectories as the modal route, the travel platform 107 can determine one trajectory within each cluster to represent the respective modal route. For example, in one embodiment, the representative trajectory is a selected one of the one or more trajectories in each cluster with a minimum sum of distances from other trajectories in each cluster. In another embodiment, the representative trajectory can be a trajectory calculated from other trajectories in the cluster (e.g., a mean trajectory or other aggregated trajectory). By way of example, the representative trajectory may identify a reduction in the number of lanes of a highway causing an increase in average journey time.

Figure 6:
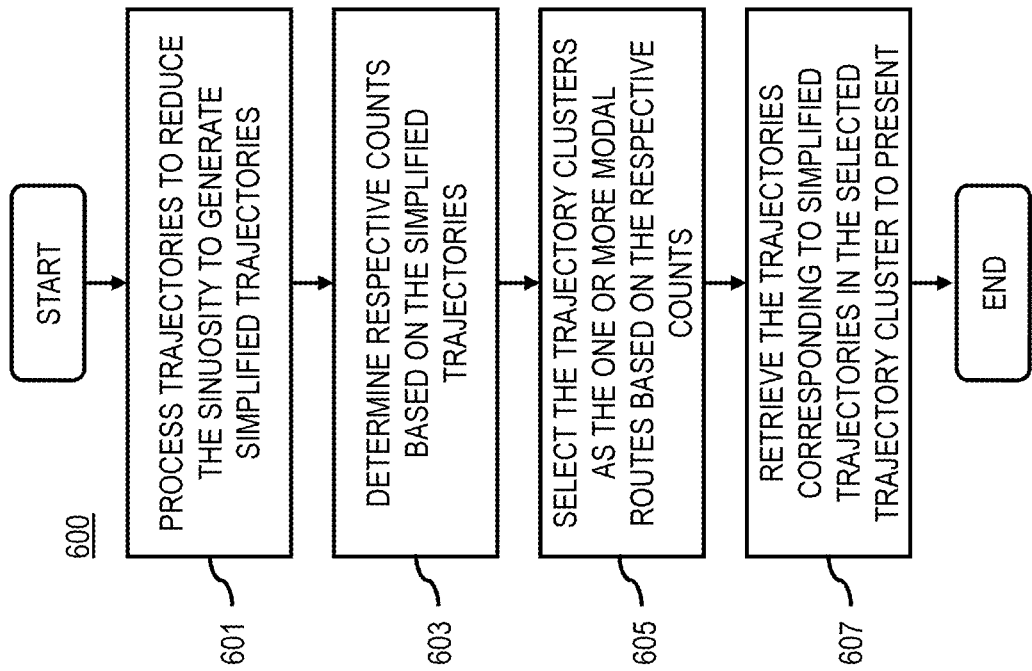
FIG. 6 is a flowchart of a process for simplifying the one or more trajectories, according to one embodiment.

FIG. 6 is a flowchart of a process for simplifying the one or more trajectories, according to one embodiment. In one embodiment, the travel platform 107 performs the process 600 and is implemented in, for instance, a chip set including a processor and a memory as shown in FIG. 15.

In step 601, the travel platform 107 processes the one or more trajectories to reduce the sinuosity of the one or more trajectories to generate respective one or more simplified trajectories. In one embodiment, the travel platform 107 reduces the sinuosity due to complexity of the distance function used by the travel platform 107 so that the travel platform 107 can cluster the one or more trajectories (e.g., the simplified trajectories) in a reasonable time. By way of example, sinuosity refers to curves, turns, bends, changes or directions, etc. that may occur in the retrieved trajectories. A high level of sinuosity increases the complexity of a trajectory, thereby also increasing the computing resources needed by the travel platform 107 to perform the clustering. In one embodiment, the travel platform 107 reduces the sinuosity of the one or more trajectories by reducing the number of turns occurring in the one or more trajectories. In one embodiment, the travel platform 107 simplifies the one or more trajectories to their major turning points using the Ramer-Douglas-Peucker algorithm as described above in Table 2. In one embodiment, the travel platform 107 can tune the distance parameter of the Ramer-Douglas-Peucker algorithm as described above in Table 2 on the distance between the one or more origins and the one or more destinations since the significance of a turning point is related to that distance. As described above, in one embodiment, with sufficient computational resources and/or time, the travel platform 107 would not need to generate the one or more simplified trajectories in order for the travel platform 107 to cluster the one or more trajectories.

In step 603, the travel platform 107 determines the respective counts based on the one or more simplified trajectories within each of the one or more trajectory clusters. In one embodiment, the travel platform 107 may determine the respective counts of the original trajectories or the simplified trajectories (if simplification is used) based on the fact that the k-medoids algorithm can return the k most popular trajectories along with a relative volume attribute (e.g., the respective trajectories counts) for each of them. In one embodiment, the respective counts of the one or more trajectories may be based on the one or more simplified trajectories because the clustering of the one or more trajectories by the travel platform 107 may comprise clustering the one or more simplified trajectories in place of the one or more trajectories (e.g., to use less computational resources and/or decrease computational time). In one embodiment, the travel platform 107 may determine the respective counts using the Voronoi iterations method to find the k clusters that minimize the intracluster distance from the medoid. The travel platform 107 then determines the respective trajectory counts for just the determined k clusters.

In step 605, the travel platform 107 selects the one or more trajectory clusters as the one or more modal routes based on the respective counts of the one or more simplified trajectories. In one embodiment, a trajectory cluster that the travel platform 107 determines has a high count (e.g., above a threshold or a top n highest count) of the one or more simplified trajectories corresponds to a popular route between the one or more origin areas and the one or more destination areas and therefore should be presented (e.g., to a user and/or a UE 103).

In step 607, the travel platform 107 retrieves the one or more trajectories corresponding to the one or more simplified trajectories in the selected one or more trajectory clusters to present. In one embodiment, if the travel platform 107 simplified the one or more trajectories for clustering (e.g., to save computational resources and/or computational time), then the travel platform 107 retrieves the one or more trajectories from the trajectory database that the travel platform 107 initially queried the one or more original trajectories from. In one embodiment, the simplified trajectories are used only internally by the travel platform 107 to reduce computational resource requirements and computing time, and are not exposed to external users.

Figure 7:
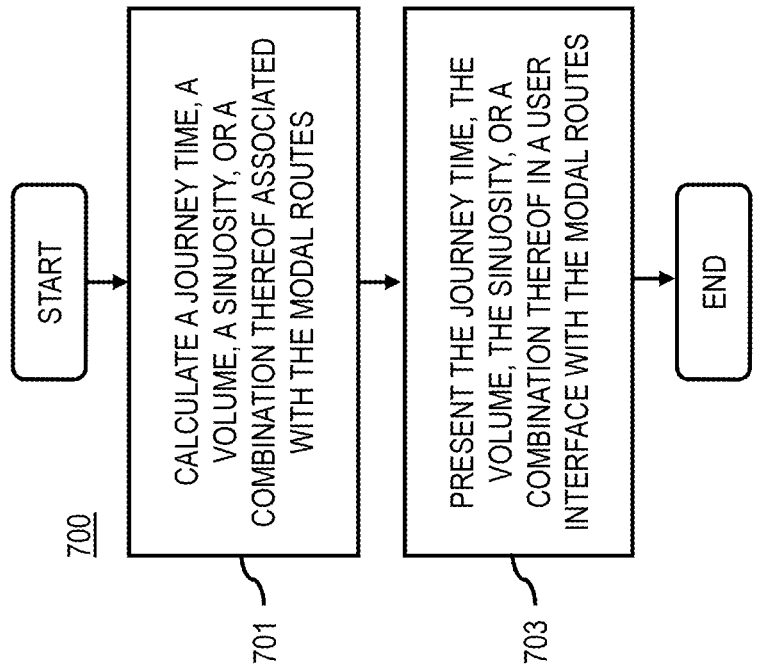
FIG. 7 is a flowchart of a process for presenting additional metrics associated with the one or more modal routes in a user interface, according to one embodiment.

FIG. 7 is a flowchart of a process for presenting additional metrics associated with the one or more modal routes in a user interface, according to one embodiment. In one embodiment, the travel platform 107 performs the process 700 and is implemented in, for instance, a chip set including a processor and a memory as shown in FIG. 15.

In step 701, the travel platform 107 calculates a journey time, a volume, a sinuosity, or a combination thereof associated with the one or more modal routes. By way of example, the journey time, the volume, and/or the sinuosity are other valuable metrics/information that may be retrieved by the travel platform 701 from each of the k clusters returned after the travel platform 107 clusters the one or more trajectories or the one or more simplified trajectories using the modified version of the k-medoids algorithm.

In step 703, the travel platform 107 presents the journey time, the volume, the sinuosity, or a combination thereof in a user interface in association with the one or more modal routes. By way of example, the user interface may be a component of a vehicle 101 (e.g., an in-dash infotainment system) and/or a UE 103. In one embodiment, the travel platform 107 could present the journey time, the volume, the sinuosity, or a combination thereof in the user interface at the same time as the one or more modal routes, upon request (e.g., a request by a user), or a combination thereof.

Figure 8:
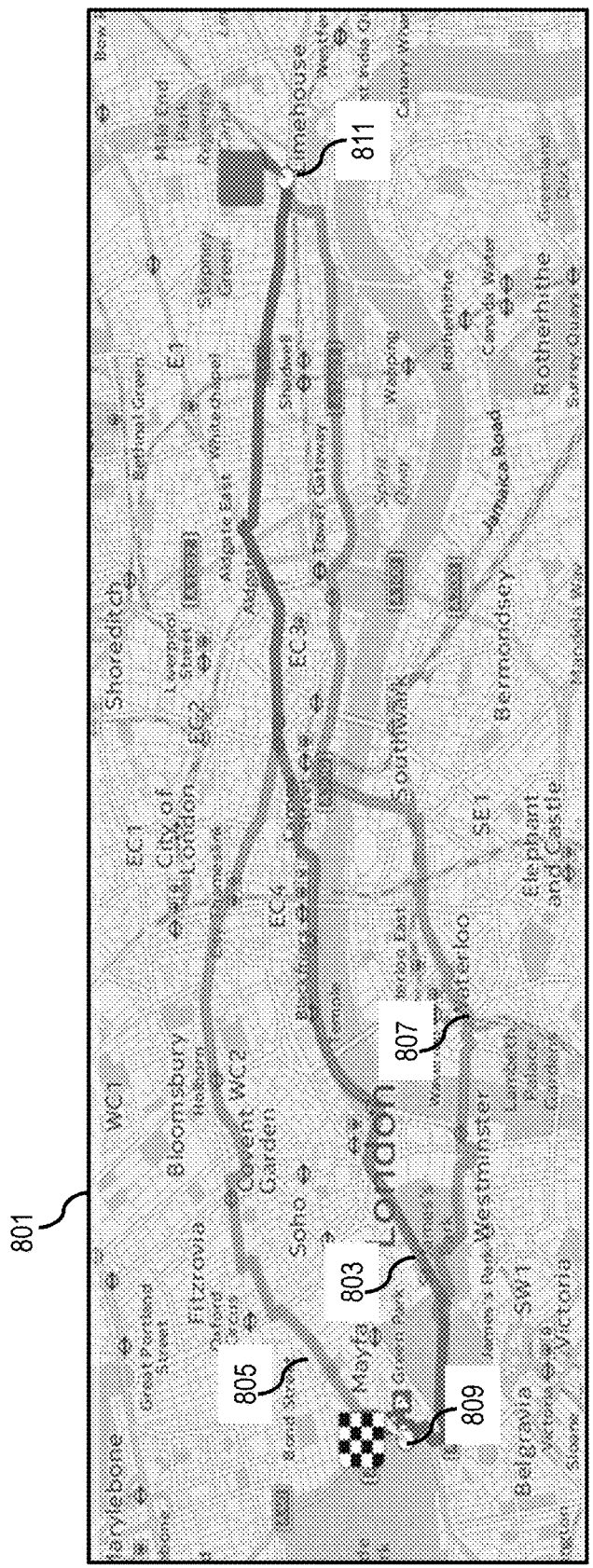
FIGS. 8 and 9 are diagrams illustrating a use case example of one or more modal routes determined between an origin area and a destination area based on trajectory data, according to one embodiment.
Figure 9:
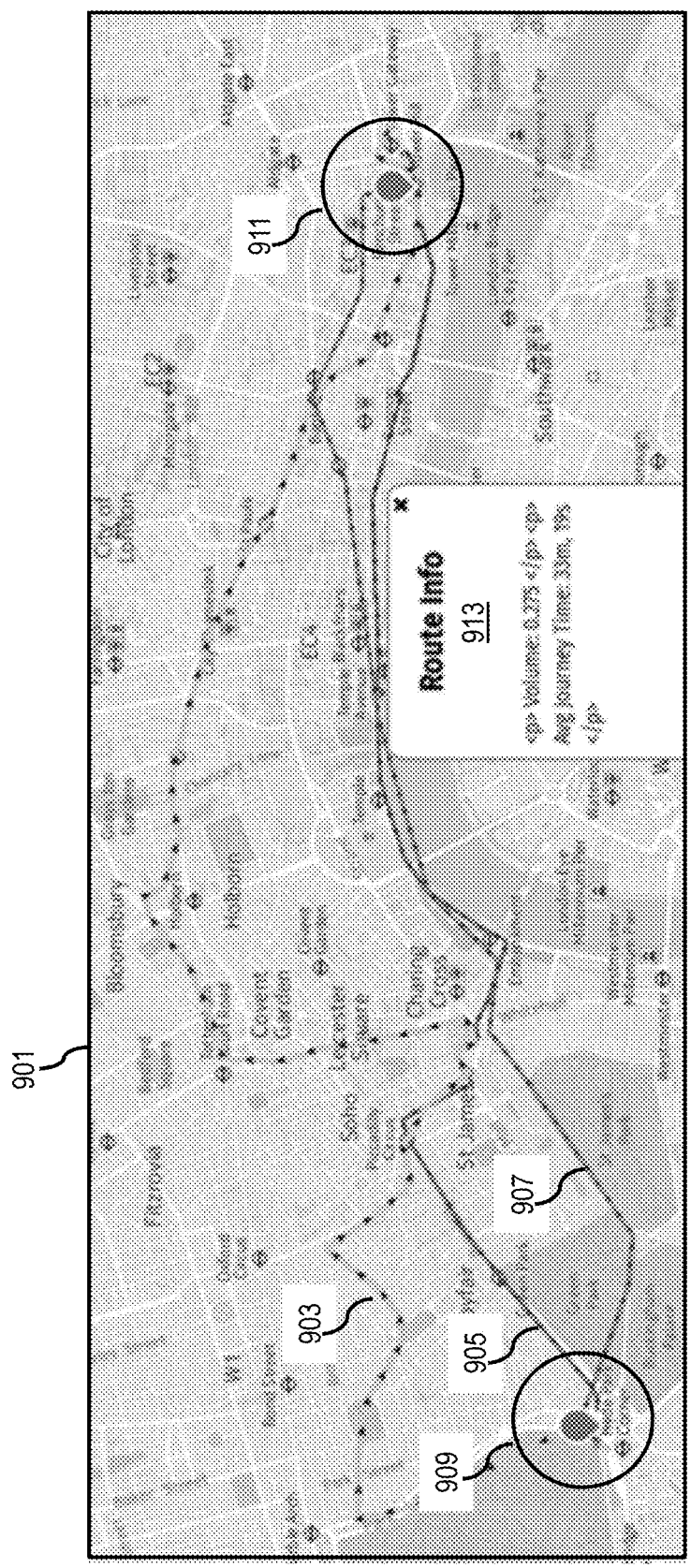

FIGS. 8 and 9 are diagrams illustrating a use case example of one or more modal routes determined between an origin area and a destination area based on trajectory data, according to one embodiment. As shown, map 801 of FIG. 8 depicts vehicle motor routes 803, 805, and 807 between an origin 809 (e.g., Hyde Park in London) and a destination 811 (e.g., Limehouse in London), wherein route 803 is the main route between the origin 809 and the destination 811. In contrast, map 901 of FIG. 9 depicts trajectory clusters 903, 905, and 907 determined by the system 100 between the origin area 909 of the origin 809 and the destination area 911 of the destination 811 of FIG. 8. In addition, the user interface 913 (e.g., a UE 103) depicts the journey time and volume associated with the subsequently determined modal route.

In one embodiment, the system 100 queries a trajectory database to retrieve one or more trajectories (not shown for illustrative convenience) that contain one or more probe points located within the origin area 909 and the destination area 911. As described above, in one embodiment, the system 100 receives a input (e.g., from a user) specifying the origin point 809, the destination point 811, the origin radius centered on the origin point 809, and the destination radius centered on the destination point 811. In one embodiment, the origin area 909 and the destination area 911 are defined by the input. In this instance, the origin area 909 and the destination area 911 are the same radius; however, it is contemplated that the origin radius and the destination radius may or may not be the same. In one embodiment, once the system 100 retrieves the one or more trajectories, the system 100 trims the trajectories and keeps only the part of the one or more trajectories or trips that go from the origin area 909 to the destination area 911. In one embodiment, the system 100 trims the one or more trajectories using the example pseudocode provided above in Table 1.

At this point, the system 100 knows all of the trips that went from the origin area 909 to the destination area 911 and the system 100 depending on available computational resources and/or computational time could begin to cluster the one or more trajectories into the one or more trajectory clusters 903, 905, and 907. In one embodiment, to reduce computational resource requirements, the system 100 optionally simplifies the one or more trajectories to make the clustering computation end in a reasonable time. Therefore, in one embodiment, the system 100 processes the one or more trajectories to reduce the sinuosity of the one or more trajectories to generate respective one or more simplified trajectories (not shown for illustrative convenience). As discussed above, sinuosity refers to the number of curves, turns, bends, changes of direction, etc. that may occur in the retrieved trajectories. A high level of sinuosity increases the complexity of a trajectory, thereby also increasing the computing resources needed to perform the clustering. In one embodiment, the system 100 reduces the sinuosity of the one or more trajectories by reducing the number of turns occurring in the one or more trajectories. In one embodiment, the system 100 simplifies the one or more trajectories using the Ramer-Douglas-Peucker algorithm provided above in Table 2.

In one embodiment, once the system 100 generates the respective one or more simplified trajectories (e.g., to reduce computational requirements and/or time), the system 100 clusters the one or more simplified trajectories into one or more simplified trajectory clusters based on a distance (e.g., the Hausdorff distance). In one embodiment, the system 100 uses the k-medoids algorithm (e.g., with k=3) to cluster the one or more simplified trajectories using the Hausdorff distance for the distance function. In one embodiment, the distance function is defined by the example code provided above in Table 3. In one embodiment, the system 100 uses the Voronoi iterations method to determine the k clusters that minimize the intracluster distance from the medoid. In one embodiment, the system 100 determines respective counts of the one or more trajectories based on the one or more simplified trajectories within each of the trajectory clusters 903, 905, and 907. In one embodiment, the k-medoids algorithm used by the system 100 will return the k most popular simplified trajectories along with a relative volume attribute (e.g., the respective trajectories counts) for each of one of the simplified trajectories. In one embodiment, the system 100 may also use the Voronoi iterations method to determine the respective counts. The system 100 then determines the respective trajectory counts from just the k clusters.

In one embodiment, the system 100 presents at least one of the trajectory clusters 903, 905, and 907 in the map 901 as the one or more modal routes based on the respective counts. In this instance, the system 100 determines that the trajectory cluster 907 is the modal route based on the respective counts. Notably, the trajectory cluster 907 or modal route matches the main route 803 of FIG. 8, a route in which a reduction in the number of vehicle lanes happened over a period of time and the resulting average journey time increased.

Figure 10:
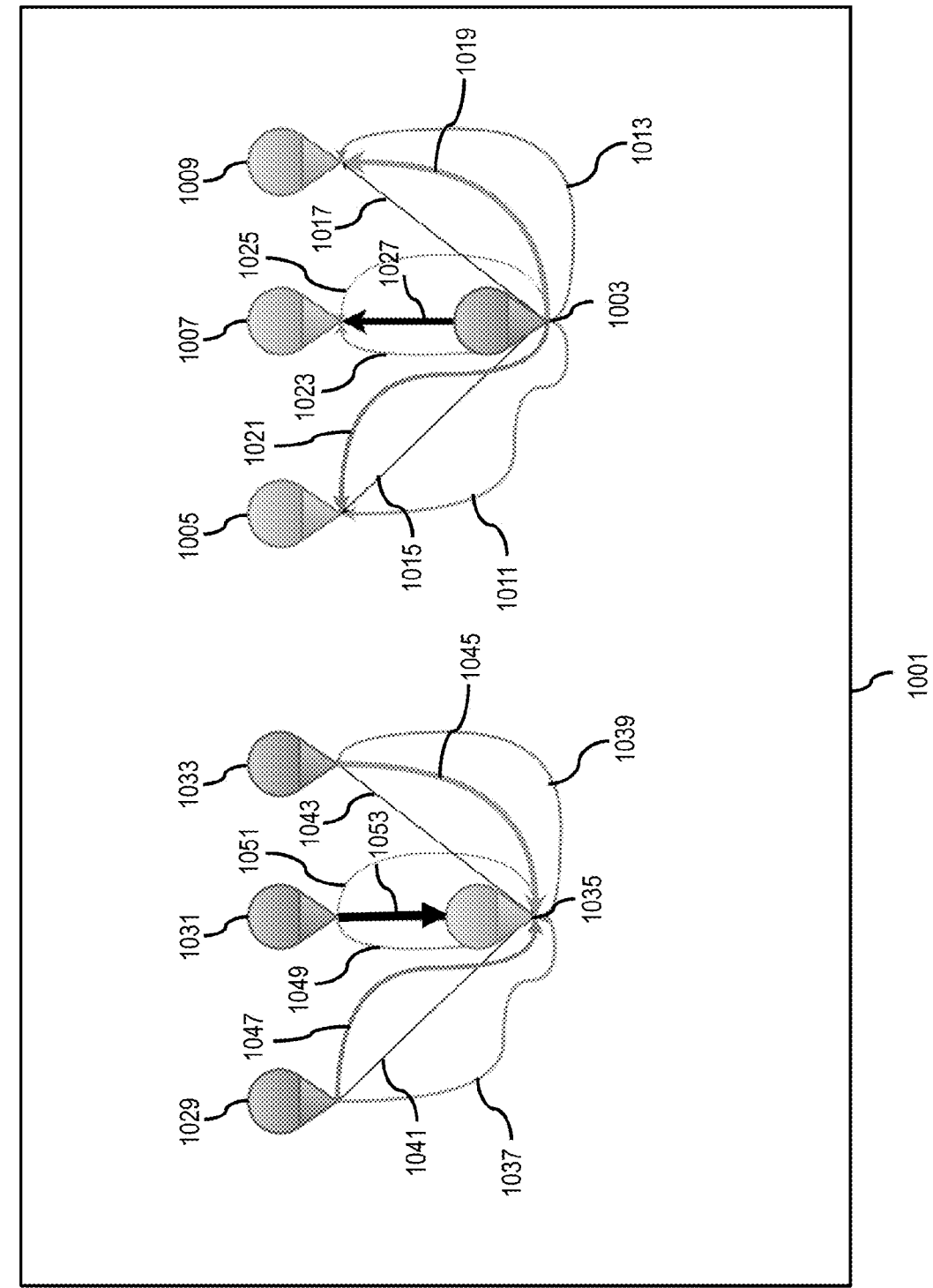
FIG. 10 is a diagram illustrating one or more modal routes between one or more origin areas and one or more destination areas, according to one embodiment.

FIG. 10 is a diagram illustrating one or more modal routes between one or more origin areas and one or more destination areas, according to one embodiment. As shown, in FIG. 10, the diagram 1001 depicts an origin area 1003 and destination areas 1005, 1007, and 1009 with trajectory clusters 1011, 1013, 1015, 1017, 1019, 1021, 1023, 1025, and 1027 there between. In this instance, the respective counts of the one or more trajectories within each of the trajectory clusters 1011-1027 is represented by the thickness or volume of the representative line such that the trajectory cluster 1027 is presented as the modal route between the origin area 1003 and the destination area 1007. By way of example, the origin area 1003 may represent a large retail enterprise's distribution center, the trajectory clusters 1011-1027 may represent the routes that shipping trucks/containers travel, and the destination areas 1005, 1007, and 1009 may represent areas of a city for customer deliveries. Similarly, diagram 1001 depicts origin areas 1029, 1031, and 1033 and the destination area 1035 with trajectory clusters 1037, 1039, 1041, 1043, 1045, 1047, 1049, 1051, and 1053 there between. In this instance, the trajectory cluster 1053 is presented as the modal route between the origin area 1031 and the destination area 1035. By way of example, the origin areas 1029, 1031, and 1033 can represent popular suburbs of a large metropolitan city 1035 and the trajectory clusters 1037-1053 may represent various routes between the suburbs 1029, 1031, and 1033 and the city 1035.

Figure 11:
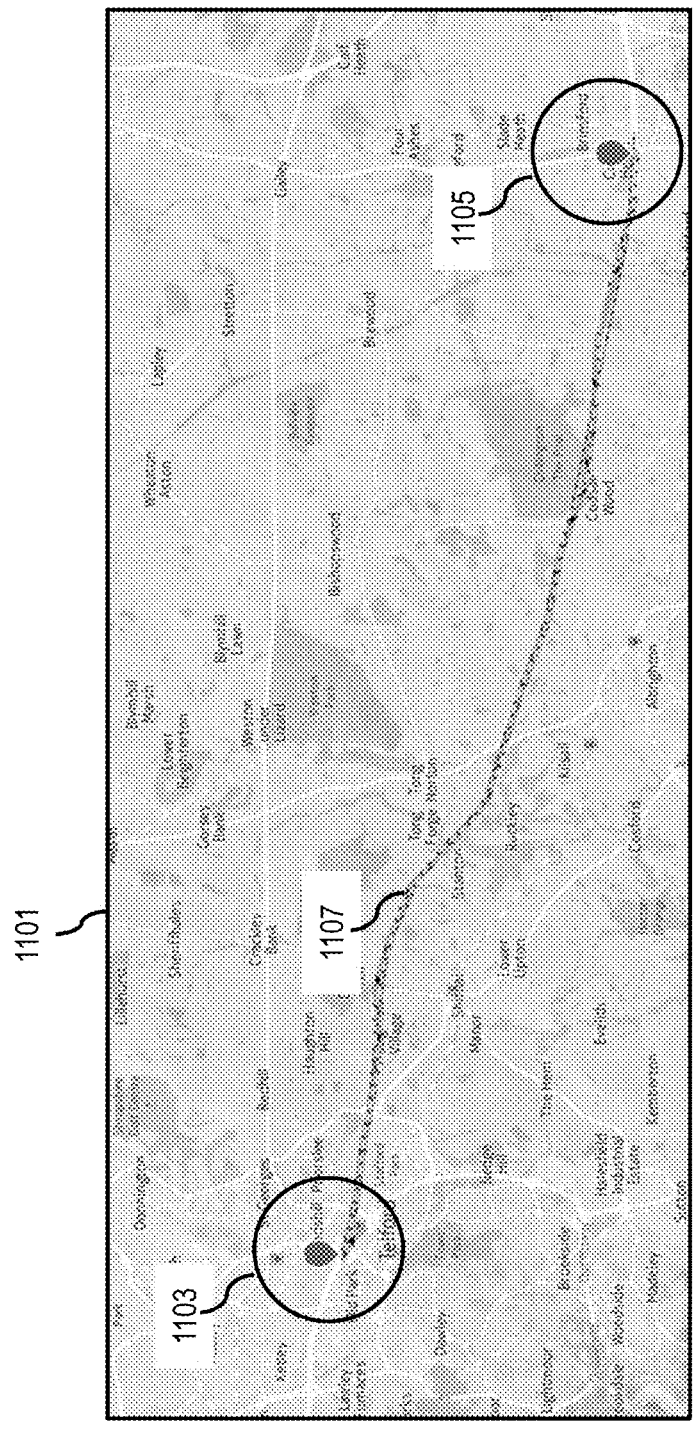
FIGS. 11 through 13 are diagrams illustrating another use case example of one or more modal routes determined between an origin area and a destination area based on trajectory data, according to one embodiment.
Figure 12:
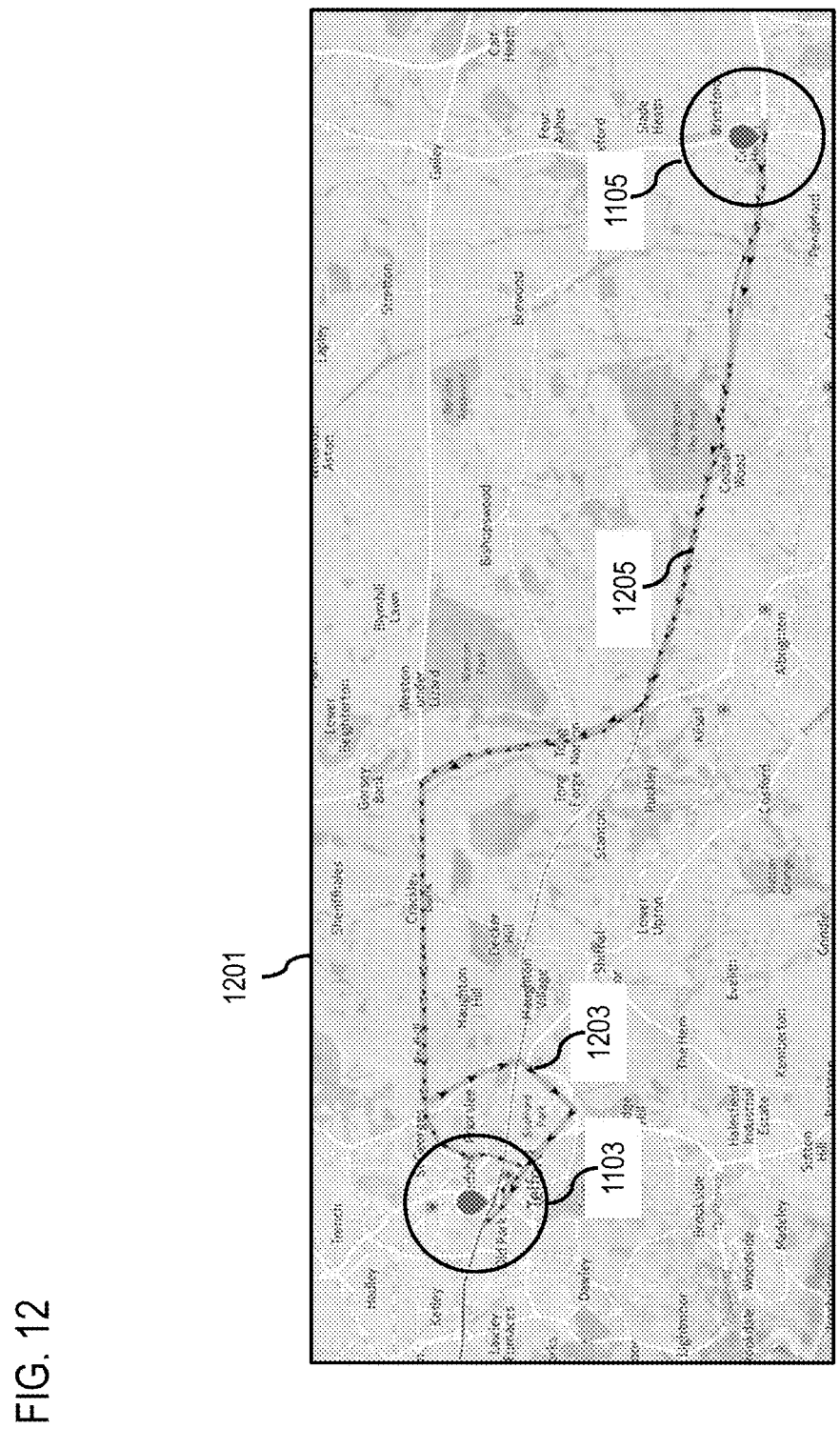
Figure 13:
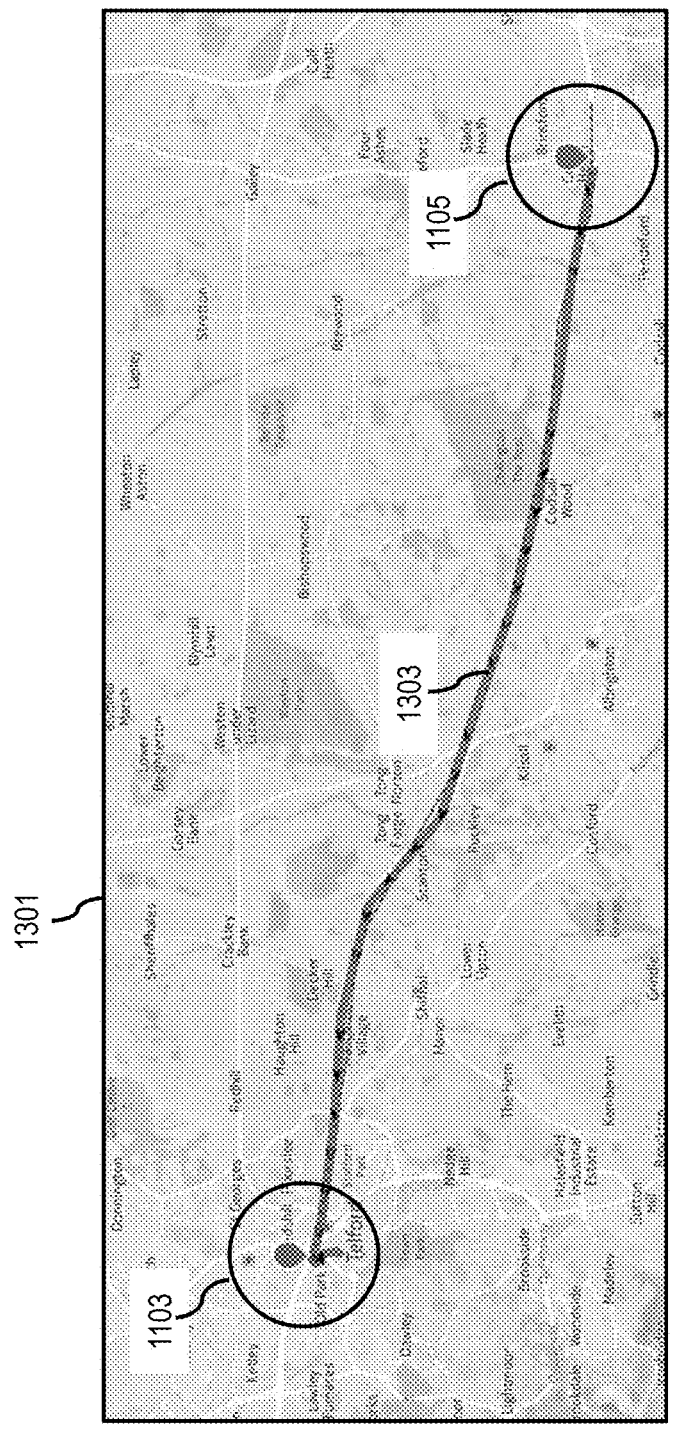

FIGS. 11 through 13 are diagrams illustrating another use case example of one or more modal routes determined between an origin area and a destination area based on trajectory data, according to one embodiment. As shown, in FIG. 11, the map 1101 depicts an origin area 1103, a destination area 1105, and a modal route 1107 determined by the system 100 between the origin area 1103 and the destination area 1105. By way of example, the modal route 1107 is determined by the system 100 based on the trajectory data during daytime construction using one or more embodiments of the method described above with respect to FIG. 1. In contrast, the map 1201 of FIG. 12 depicts the modal routes 1201 and 1203 determined by the system 100 based on trajectory data between the origin 1103 and the destination area 1105 during nighttime construction using one or more embodiments of the method described above with respect to FIG. 1. As shown, in FIG. 13, the map 1301 depicts the modal route 1303 determined by the system 100 based on trajectory data between the origin area 1103 and the destination area 1105 during the nighttime after the completion of the construction using one or more embodiments of the method described above with respect to FIG. 1. By comparing the modal routes 1107, 1201, 1203, and 1303, the system 100 can determine an anomaly in the modal routes (e.g., why people are not taking the fastest route (e.g., 1303) during the night), which in this case is due to construction.

The processes described herein for determining one or more modal routes between one or more origin areas and one or more destination areas based on trajectory data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
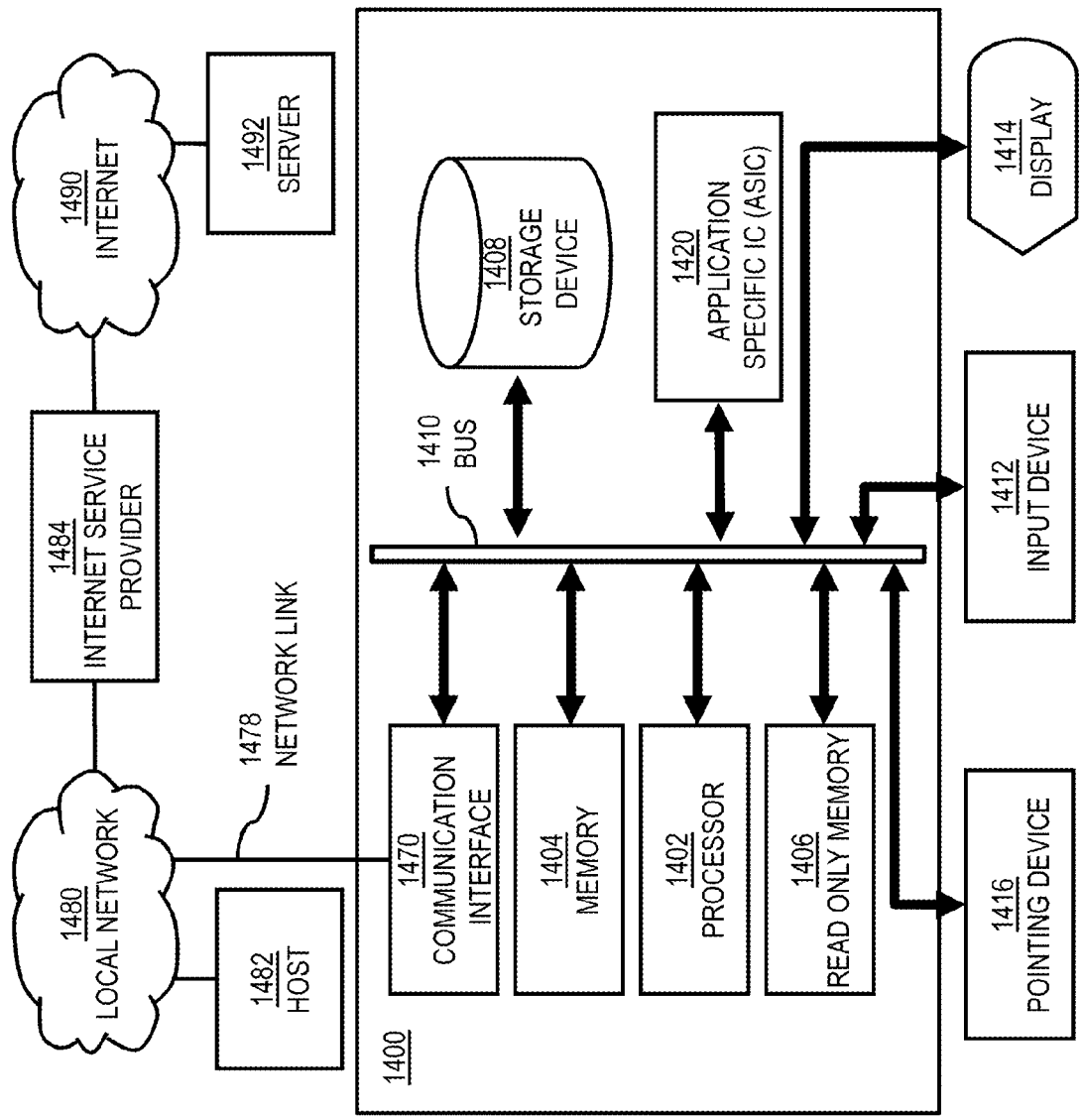
FIG. 14 is a diagram of hardware that can be used to implement an embodiment of the invention.

FIG. 14 illustrates a computer system 1400 upon which an embodiment of the invention may be implemented. Computer system 1400 is programmed (e.g., via computer program code or instructions) to determine one or more modal routes between one or more origin areas and one or more destination areas based on trajectory data as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to determining one or more modal routes between one or more origin areas and one or more destination areas based on trajectory data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing determining one or more modal routes between one or more origin areas and one or more destination areas based on trajectory data. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for determining one or more modal routes between one or more origin areas and one or more destination areas based on trajectory data, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 105 for determining one or more modal routes between one or more origin areas and one or more destination areas based on trajectory data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to determine one or more modal routes between one or more origin areas and one or more destination areas based on trajectory data as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to determine one or more modal routes between one or more origin areas and one or more destination areas based on trajectory data. The memory 1505 also stores the data associated with or generated by the execution of the inventive steps.

Figure 16:
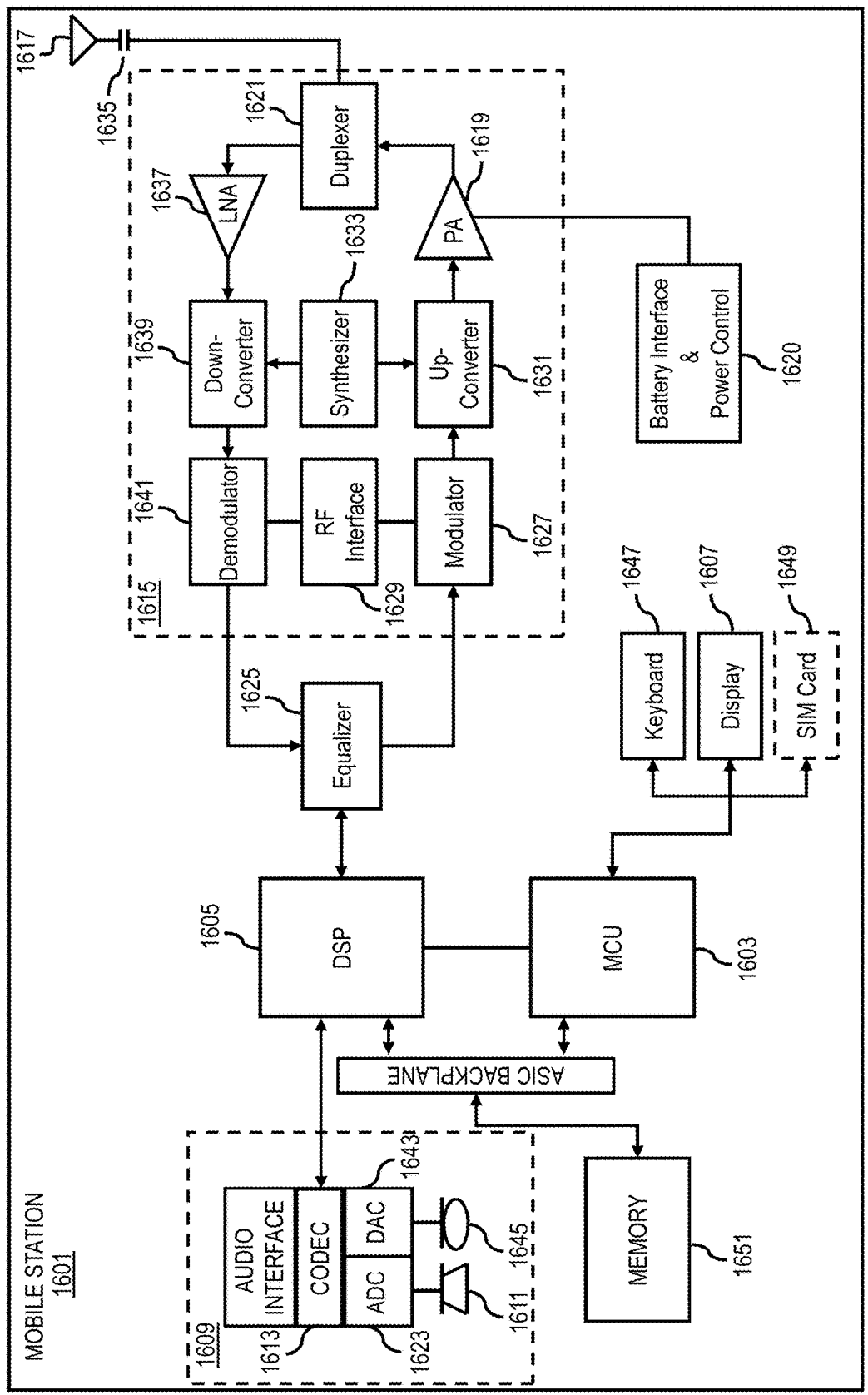
FIG. 16 is a diagram of a mobile terminal (e.g., handset) that can be used to implement an embodiment of the invention.

FIG. 16 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to determine one or more modal routes between one or more origin areas and one or more destination areas based on trajectory data. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining one or more modal routes between one origin area and one destination area based on trajectory data comprising:
    querying, by a processor, a trajectory database to retrieve trajectories that contain probe points located within the origin area and the destination area, wherein the probe points are collected from one or more sensors of a plurality of devices traveling between the origin area and the destination area, and wherein the probe points indicate a position, a heading, a speed, a time, or a combination thereof of each of the plurality of devices;
    clustering, by the processor, the trajectories into trajectory clusters;
    processing the trajectories to reduce sinuosity of the trajectories to generate respective other trajectories, wherein clustering of the trajectories comprises clustering the other trajectories in place of the trajectories;
    determining, by the processor, respective counts of the trajectories within each of the trajectory clusters; and
    presenting and recommending, by the processor, at least one of the trajectory clusters as the one or more modal routes in a user interface based on the respective counts that are higher than the remaining trajectory clusters, wherein the trajectory clusters comprise a representative trajectory selected as one of the trajectories in each cluster with a minimum sum of distances from other trajectories in the each cluster.

2. The method of claim 1, further comprising:
    determining the respective counts based on the other trajectories within each of the trajectory clusters;
    selecting from among the trajectory clusters the one or more modal routes based on the respective counts of the other trajectories; and
    retrieving the trajectories corresponding to the other trajectories in the selected trajectory clusters to present.

3. The method of claim 1, wherein the sinuosity is reduced by reducing a number of turns occurring in the trajectories.

4. The method of claim 1, further comprising:
    trimming the trajectories based on the origin area and the destination area prior to the generating the other trajectories, the clustering of the trajectories, the presenting of the at least one of the trajectory clusters as the one or more modal routes, or a combination thereof.

5. The method of claim 1, further comprising:
    receiving an input specifying one origin point, one destination point, one origin radius centered on the origin point, and one destination radius centered on the destination point,
    wherein the origin area is defined by the origin point and the origin radius and the destination area is defined by the destination point and the destination radius.

6. The method of claim 1, further comprising:
    determining the representative trajectory for each of the trajectory clusters presented as the one or more modal routes,
    wherein the representative trajectory represents a respective one of the one or more modal routes.

7. The method of claim 1, further comprising:
    calculating a journey time, a volume, the sinuosity, or a combination thereof associated with the one or more modal routes; and
    presenting the journey time, the volume, the sinuosity, or a combination thereof in the user interface in association with the one or more modal routes.

8. An apparatus for determining one or more modal routes between one origin area and one destination area based on trajectory data, comprising:
    at least one processor; and
    at least one memory including computer program code for one or more programs,
    the at least one memory and the computer program code configured to, with the at least one processor, cause the apparatus to perform at least the following,
        query a trajectory database to retrieve trajectories that contain probe points located within the origin area and the destination area, wherein the probe points are collected from one or more sensors of a plurality of devices traveling between the origin area and the destination area, and wherein the probe points indicate a position, a heading, a speed, a time, or a combination thereof of each of the plurality of devices;
        cluster the trajectories into trajectory clusters;
        process the trajectories to reduce sinuosity of the trajectories to generate respective other trajectories, wherein clustering of the trajectories comprises clustering the other trajectories in place of the trajectories;
        determine respective counts of the trajectories within each of the trajectory clusters; and
        present and recommend at least one of the trajectory clusters as the one or more modal routes in a user interface based on the respective counts that are higher than the remaining trajectory clusters, wherein the trajectory clusters comprise a representative trajectory selected as one of the trajectories in each cluster with a minimum sum of distances from other trajectories in the each cluster.

9. The apparatus of claim 8, wherein the apparatus is further caused to:
    determine the respective counts based on the other trajectories within each of the trajectory clusters;
    select from among the trajectory clusters the one or more modal routes based on the respective counts of the other trajectories; and
    retrieve the trajectories corresponding to the other trajectories in the selected trajectory clusters to present.

10. The apparatus of claim 8, wherein the apparatus is further caused to:
    trim the trajectories based on the origin area and the destination area prior to the generating the other trajectories, the clustering of the trajectories, the presenting of the at least one of the trajectory clusters as the one or more modal routes, or a combination thereof.

11. The apparatus of claim 8, wherein the apparatus is further caused to:
receive an input specifying one origin point, one destination point, one origin radius centered on the origin point, and one destination radius centered on the destination point,
wherein the origin area is defined by the origin point and the origin radius and the destination area is defined by the destination point and the destination radius.

12. The apparatus of claim 8, wherein the apparatus is further caused to:
determine the representative trajectory for each of the trajectory clusters presented as the one or more modal routes,
wherein the representative trajectory represents a respective one of the one or more modal routes.

13. A non-transitory computer-readable storage medium carrying one or more sequences of one or more instructions which, when executed by one or more processors, cause an apparatus to at least perform the following steps, for determining one or more modal routes between one origin area and one destination area based on trajectory data:
querying a trajectory database to retrieve trajectories that contain probe points located within the origin area and the destination area, wherein the probe points are collected from one or more sensors of a plurality of devices traveling between the origin area and the destination area, and wherein the probe points indicate a position, a heading, a speed, a time, or a combination thereof of each of the plurality of devices;
clustering the trajectories into trajectory clusters;
processing the trajectories to reduce sinuosity of the trajectories to generate respective other trajectories, wherein clustering of the trajectories comprises clustering the other trajectories in place of the trajectories;
determining respective counts of the trajectories within each of the trajectory clusters; and
presenting and recommending at least one of the trajectory clusters as the one or more modal routes in a user interface based on the respective counts that are higher than the remaining trajectory clusters, wherein the trajectory clusters comprise a representative trajectory selected as one of the trajectories in each cluster with a minimum sum of distances from other trajectories in the each cluster.

14. The non-transitory computer-readable storage medium of claim 13, wherein the apparatus is further caused to perform:
determining the respective counts based on the other trajectories within each of the trajectory clusters;
selecting from among the trajectory clusters the one or more modal routes based on the respective counts of the other trajectories; and
retrieving the trajectories corresponding to the other trajectories in the selected trajectory clusters to present.

15. The non-transitory computer-readable storage medium of claim 13, wherein the apparatus is further caused to perform:
trimming the trajectories based on the origin area and the destination area prior to the generating the other trajectories, the clustering of the trajectories, the presenting of the at least one of the trajectory clusters as the one or more modal routes, or a combination thereof.

16. The non-transitory computer-readable storage medium of claim 13, wherein the apparatus is further caused to perform:
receiving an input specifying one origin point, one destination point, one origin radius centered on the origin point, and one destination radius centered on the destination point,
wherein the origin area is defined by the origin point and the origin radius and the destination area is defined by the destination point and the destination radius.

* * * * *